(12) United States Patent
Okada

(10) Patent No.: US 8,022,999 B2
(45) Date of Patent: Sep. 20, 2011

(54) DEVIATION DETECTOR, DEVIATION CORRECTOR AND IMAGING DEVICE

(75) Inventor: Hiroyuki Okada, Osaka (JP)

(73) Assignee: Sony Corporation, Tokyo (JP)

( * ) Notice: Subject to any disclaimer, the term of this patent is extended or adjusted under 35 U.S.C. 154(b) by 513 days.

(21) Appl. No.: 11/815,222

(22) PCT Filed: Dec. 5, 2006

(86) PCT No.: PCT/JP2006/324251
§ 371 (c)(1),
(2), (4) Date: Aug. 1, 2007

(87) PCT Pub. No.: WO2007/077707
PCT Pub. Date: Jul. 12, 2007

(65) Prior Publication Data
US 2009/0021589 A1     Jan. 22, 2009

(30) Foreign Application Priority Data
Dec. 28, 2005   (JP) ................. 2005-378986

(51) Int. Cl.
H04N 5/228 (2006.01)
(52) U.S. Cl. ............ 348/208.7; 348/208.3; 396/55
(58) Field of Classification Search ........... 348/208.3
See application file for complete search history.

(56) References Cited

U.S. PATENT DOCUMENTS

| | | | | |
|---|---|---|---|---|
| 5,861,915 A * | 1/1999 | Sato et al. | ............. | 348/208.2 |
| 6,198,504 B1 * | 3/2001 | Nobuoka | ............. | 348/208.3 |
| 6,429,895 B1 * | 8/2002 | Onuki | ............. | 348/208.99 |
| 6,734,902 B1 * | 5/2004 | Kawahara | ............. | 348/208.8 |
| 7,583,890 B2 * | 9/2009 | Kakiuchi | ............. | 396/55 |
| 2004/0056963 A1 * | 3/2004 | Ishikawa | ............. | 348/208.1 |
| 2007/0009242 A1 * | 1/2007 | Okada | ............. | 396/52 |

FOREIGN PATENT DOCUMENTS

| | | | |
|---|---|---|---|
| JP | 63 25635 | | 2/1988 |
| JP | 6-222414 | | 8/1994 |
| JP | 2002 99015 | | 4/2002 |
| JP | 2004260525 | A * | 9/2004 |
| JP | 2007 19686 | | 1/2007 |

* cited by examiner

*Primary Examiner* — Lin Ye
*Assistant Examiner* — Dennis Hogue
(74) *Attorney, Agent, or Firm* — Oblon, Spivak, McClelland, Maier & Neustadt, L.L.P.

(57) ABSTRACT

The correction amounts of respective correction units 37 of first and second shake correction amount deriving units 38, 39 are alternately employed in every short period composed of a time shorter than a period up to a timing at which it is contemplated that the output from a first HPF 31 is approximately stabilized after a switch S1 is turned on, and the signals of shake correction amounts, which are obtained by subjecting the outputs from first integration units 35 to a correction of the correction amounts, are alternately employed as drive signals to be output to the X-axis and Y-axis actuators 27, 28. With this arrangement, a shake correction amount deriving unit, which is operated later than a shake correction amount deriving unit operated just before it, can derive a shake correction amount based on a state in which a first HPF 31 has a smaller output error.

12 Claims, 10 Drawing Sheets

DEVIATION DETECTOR, DEVIATION CORRECTOR AND IMAGING DEVICE

TECHNICAL FIELD

The present invention relates to a shake detection apparatus, a shake correction apparatus, and an image pickup apparatus for detecting shake applied to, for example, a digital camera and the like.

BACKGROUND ART

Conventionally, when an image is picked up telescopically or in a dark portion (in which long time exposure is required) in a handheld fashion, there is a possibility that "shake" such as hand shake and the like occur. To ensure reliable photography, there is widely known an image pickup apparatus having a so-called hand-shake correcting function mounted thereon to ensure reliable image pickup. The hand-shake correcting function is arranged such that when an optical axis is dislocated by shake applied to the image pickup apparatus by hand-shake and the like of a user, the dislocation of the optical axis is corrected by driving a shake correction optical system and an image pickup device according to the shake.

The image pickup apparatus on which the shake correcting function is mounted is provided with a shake detection sensor composed of, for example, a gyro for detecting a shake amount of the image pickup apparatus. A shake angle of the image pickup apparatus is calculated by integrating the output from the shake detection sensor, and the shake correction optical system and the like are driven based on the information of the calculated shake angle.

The shake detection sensor has a relatively large individual difference in a detection output when the image pickup apparatus is in a stationary state, and further since the detected output changes depending on an environmental temperature, the shake detection sensor is ordinarily connected to an amplifier through a high-pass filter composed of a capacitor and a resistor device so that a direct current component signal is eliminated from the output signal of the shake detection sensor.

In contrast, there is, for example, Patent Document 1 described below as a document relating to this technical field. The technology disclosed in Patent Document 1 relates to a camera on which a shake correcting function is mounted to correct movement of a subject image on a light receiving surface by calculating a shake amount of the camera from a signal output from an angular speed sensor and driving a correction optical system disposed in a light path of an image-pickup optical system based on the shake amount. The shake correcting function is composed of direct current cut means for cutting a direct current component included in the output voltage of the angular speed sensor, subtraction means for subtracting a direct current component voltage V3 from the output voltage V1 of the angular speed sensor, direct current detection means for calculating a direct current component by carrying out an arithmetic operation of (V3+V2/Kx) based on the output voltage V2 of the subtraction means, and setting means for setting a detection standard of the direct current detection means by changing the coefficient Kx, wherein the coefficient Kx is set to a relatively small value K1 during a period from a time at which a power is supplied to a time at which a light measuring switch is turned on so that a frequency component is cut up to a relatively high frequency component, the coefficient Kx is continuously changed toward a value K2 larger than the value K1 during a period in which a predetermined time has passed from the time at which the light measuring switch is turned on, and thereafter the coefficient Kx is set to the above value K2 so that only a relatively low frequency component is cut.

[Patent Document 1] Japanese Unexamined Patent Application Publication No. 8-82823

DISCLOSURE OF THE INVENTION

Problems to be Solved by the Invention

When the shake detection sensor is provided with the high-pass filter composed of a capacitor and a resistor device and, for example, panning operation is carried out to the image pickup apparatus, the output signal of the shake detection sensor includes a relatively large amount of the direct current component signal. As a result, the high-pass filter outputs a direct current component signal having an inverse polarity (however, the signal is attenuated by the time constant of the high-pass filter), thereby an erroneous result of detection (detected angle) is created and thus a shake correction performance is deteriorated.

Accordingly, an object of the present invention, which was made in view of the above circumstances, is to provide a shake detection apparatus, a shake correction apparatus, and an image pickup apparatus capable of preventing or suppressing deterioration of a shake correction performance.

Means for Solving the Problems

An invention according to claim 1 is a shake detection apparatus characterized by comprising shake detection means for outputting an electric signal according to shake applied to the shake detection apparatus, integration means for integrating the electric signal output from the shake detection means, a plurality of shake correction amount deriving means for deriving shake correction amounts for correcting shake shown by the electric signal output from the shake detection means, control means for causing one shake correction deriving means among the plurality of shake correction amount deriving means to start an operation after a first predetermined time has passed from a timing at which other shake correction amount deriving means is caused to start an operation, and output means for selecting any of the plurality of shake correction amount deriving means and outputting the shake correction amount derived by the selected shake correction amount deriving means as a shake correction amount used to correct the shake applied to the shake detection apparatus.

According to the invention, the plurality of shake correction amount deriving means are provided, one shake correction deriving means among the plurality of shake correction amount deriving means is caused to start an operation after a first predetermined time has passed from a timing at which other shake correction amount deriving means is caused to start an operation as well as any of the plurality of shake correction amount deriving means is selected and the shake correction amount derived by the selected shake correction amount deriving means is output as a shake correction amount used to correct the shake applied to the shake detection apparatus. Accordingly, the shake correction amount can be derived based on the output of a shake detection means having a smaller error.

That is, when a panning operation is carries out to, for example, an image pickup apparatus on which the shake detection apparatus is mounted, although the shake detection means outputs a direct current component signal having an inverse polarity, the signal is gradually attenuated, thereby an output error (error to a shake state of an actual image pickup apparatus) is decreased.

Accordingly, when the respective shake correction amount deriving means are caused to carries out operations at delayed timings after the panning operation is carries out, a shake correction amount deriving means operated later can derive a shake correction amount using a state, in which the shake detection means has a smaller output error, as a reference. Accordingly, even if the shake detection means outputs a direct current component signal having an inverse polarity, deterioration of a shake correction performance can be prevented or suppressed.

An invention according to claim 2 is a shake detection apparatus according to claim 1 which is characterized in that the shake correction amount deriving means comprises first integration means for integrating the electric signal output from the shake detection means, second integration means for integrating the output from the first integration means, and correction means for correcting the output from the first integration means using the output from the second integration means after a second predetermined time has passed from the timing at which the first integration means starts an operation.

According to the invention, when the shake detection means outputs an electric signal resulting from shake applied to the shake detection apparatus, the electric signal output from the shake detection means is integrated by the first integration means. Further, the output from the first integration means is integrated by the second integration means. Then, the output from the first integration means is corrected by the correction means using the output from the second integration means after the second predetermined time has passed from the timing at which the first integration means starts the operation.

An invention according to claim 3 is a shake detection apparatus according to claim 2 which is characterized in that the first and second predetermined times are made to the same time.

According to the invention, since the first and second predetermined times are made to the same time, a time management can be carried out easily as compared with a case in which the first predetermined time is different from the second predetermined time. As a result, a circuit and a program for carrying out the time management can be easily created.

An invention according to claim 4 is a shake detection apparatus according to claim 2 or 3 which is characterized in that the output means carries out the selection when a correction is carried out by the correction means.

According to the invention, since the shake correction amount deriving means is selected when the correction is carried out by the correction means, a time can be easily managed as compared with a case in which a timing, at which the correction is carried out by the correction means, is different from a timing, at which the selection is carried out by the output means. As a result, a circuit and a program for carrying out the time management can be easily created.

An invention according to claim 5 is a shake detection apparatus according to any of claims 2 to 4 which is characterized by comprising storage means for storing the correction amount used by the correction means of the shake correction amount deriving means selected by the output means, wherein the output means compares a correction amount of this time used by correction means of any one of shake correction amount deriving means which are not selected with the latest correction amount stored by the storage means and selects shake correction amount deriving means corresponding to a smaller correction amount as well as outputs a shake correction amount derived based on the smaller correction amount as a shake correction amount used to correct the shake applied to the shake detection apparatus.

According to the invention, the correction amount used by the correction means of the shake correction amount deriving means selected by the output means is stored, the correction amount of this time used by the correction means of any one of the shake correction amount deriving means which are not selected by the output means is compared with the latest correction amount stored by the storage means and the shake correction amount deriving means corresponding to the smaller correction amount is selected as well as the shake correction amount derived based on the smaller correction amount is output as the shake correction amount used to correct the shake applied to the shake detection apparatus. Accordingly, the shake correction amount can be derived based on a state in which the shake detection means has a small output error.

An invention according to claim 6 is a shake detection apparatus according to any of claim 2 to 5 which is characterized in that the correction means comprises multiplication means for multiplying the output of this time of the second integration means by a predetermined coefficient, and subtraction means for subtracting a multiplied value obtained by a multiplication processing of the multiplication means from the output of next time from the first integration means and outputting a subtracted value to the first integration means.

According to the invention, according to the invention, the output of this time from the second integration means is multiplied by the predetermined coefficient by the multiplication means, the multiplied value obtained by the multiplication processing of the multiplication means is subtracted from the output of next time from the first integration means, and the subtracted value is output to the first integration means.

An invention according to claim 7 is a shake detection apparatus according to any of claims 1 to 6 which is characterized in that when the shake correction amount deriving means selected by the output means is changed, the control means temporarily interrupts the operation of any of the shake correction amount deriving means which are not selected by the output means and then resumes it.

According to the invention, when the shake correction amount deriving means selected by the output means is changed, since the operation of any of the shake correction amount deriving means which are not selected by the output means and is temporarily interrupted and then resumed, the shake correction amount deriving means can derive the shake correction amount based on the state that the shake detection means has a smaller output error without being influenced by the electric signal output from the shake detection means before the interruption is carried out.

An invention according to claim 8 is a shake detection apparatus according to any of claims 1 to 7 which comprises a high-pass filter comprising a capacitor and a resistor device, wherein an electric signal output from the shake detection means is input to the high-pass filter, and the high-pass filter outputs the electric signal to the integration means after it eliminates a predetermined low frequency component signal from the electric signal.

According to the invention, a problem inherent to a case in which the shake detection apparatus is provided with the high-pass filter, that is, a problem in that an erroneous contact signal is created and a shake correction performance is deteriorated thereby by that the high-pass filter outputs a direct current component signal having an inverse polarity because the direct current component signal is included in the electric signal of the shake detection means in a large amount can be prevented or suppressed.

An invention according to claim 9 is a shake correction apparatus for correcting image shake, which is generated by a shake applied to the shake correction apparatus, of a subject optical image picked up by pickup means, the shake correction apparatus being characterized by comprising an image pickup optical system for imaging the subject optical image, a shake detection apparatus according to any of claims 1 to 8, and drive means for calculating a shake correction amount for fixing the imaging position of the subject optical image picked up by the image pickup optical system with respect to a light receiving surface of the image pickup means based on the shake detection signal output from the shake detection apparatus and driving a target based on the calculated shake correction amount.

According to the invention, when the shake detection signal is output by the shake detection apparatus, the shake correction amount, which fixes the imaging position of the subject optical image picked up by the image pickup optical system with respect to the light receiving surface of the image pickup means based on the shake detection, is calculated, and the target is driven based on the calculated shake correction amount to carry out the correction. Since the shake detection apparatus according to any of claims 1 to 8 is mounted as described above, the shake correction apparatus, in which deterioration of a shake correction accuracy is prevented or suppressed, can be obtained.

An invention according to claim 10 is an image pickup apparatus which is characterized by comprising a shake correction apparatus according to claim 9, image pickup means for picking up a subject image whose image shake is corrected by the shake correction apparatus, and input means for inputting an instruction according to an image pickup operation to the image pickup means, wherein the shake correction apparatus carries out a shake correcting operation when the instruction is input by the input means.

According to the invention, an image pickup apparatus, in which deterioration of a shake correction accuracy is prevented or suppressed, can be realized.

An invention according to claim 11 is an image pickup apparatus according to claim 10 which is characterized in that the control means causes correction means in any of shake correction amount deriving means to start a correcting operation after a predetermined time has passed from a timing at which the input means inputs the instruction and causes correction means in other shake correction amount deriving means to start a correcting operation after the first predetermined time has passed from the timing at which the above correcting operation is started.

According to the invention, the correction means in any of the shake correction amount deriving means is caused to start the correcting operation after the predetermined time has passed from the timing at which the input means inputs the instruction and the correction means in the other shake correction amount deriving means is caused to start the correcting operation after the first predetermined time has passed from the timing at which the above correcting operation is started. Therefore, the shake correcting operation is carried out to a subject optical image which is picked up by the image pickup means after the instruction is input.

ADVANTAGES

According to the present invention, the plurality of shake correction amount deriving means are provided and the shake correction amount is derived based on the electric signal of the shake detection means at timings which are different in the respective shake correction amount deriving means as well as the shake correction amount, which is derived based on the electric signal of the shake detection means having a smallest output error at the time, is output as a shake correction amount used to correct the shake applied to the shake detection apparatus. Accordingly, even if the shake detection means outputs a direct current component signal having an inverse polarity, deterioration of a shake correction performance can be prevented or suppressed, thereby deterioration of an image quality of a picked up image can be prevented or suppressed.

Figure 4:
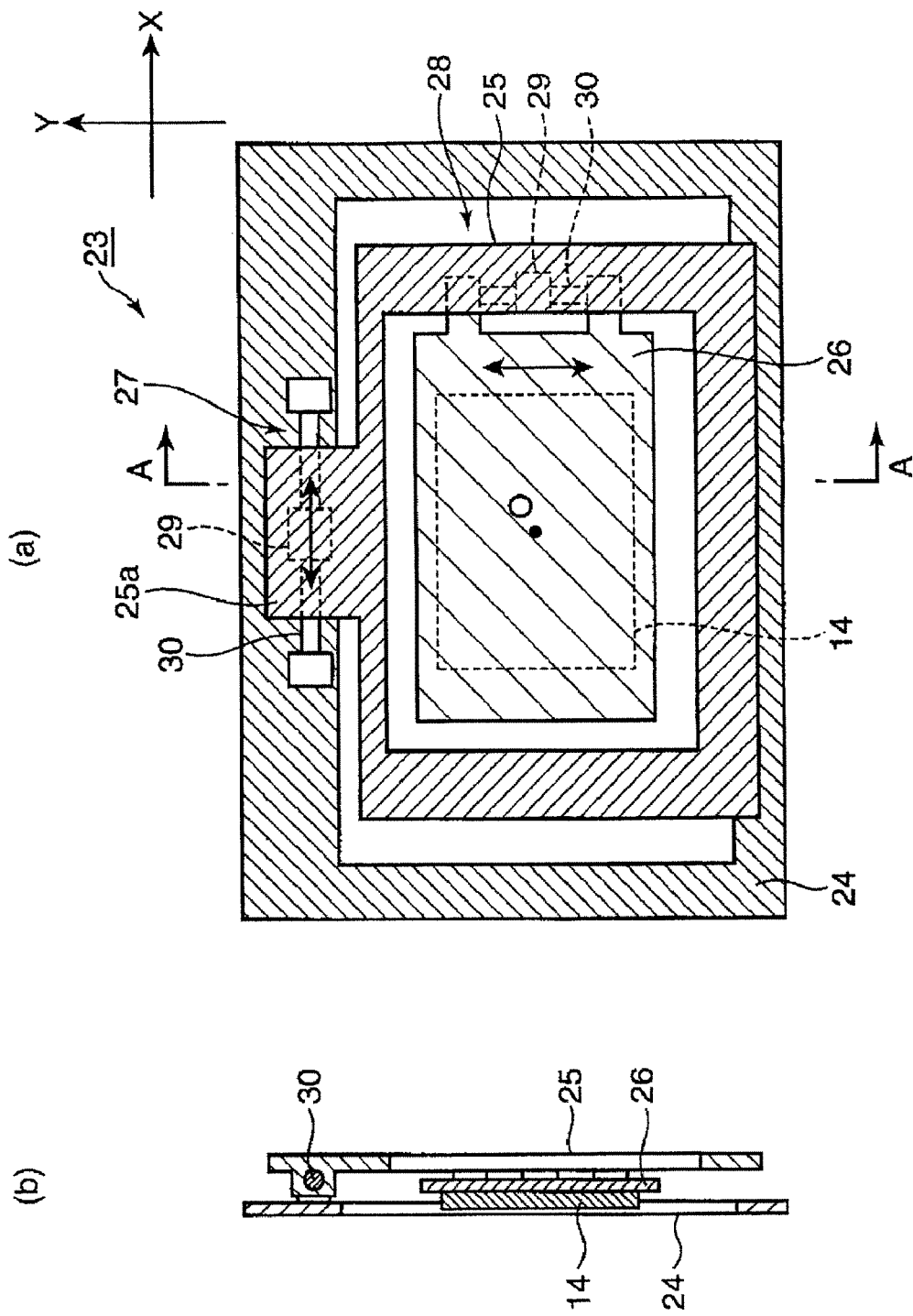

Parts (a) and (b) of FIG. 4 are views showing an example of an arrangement of a shake correction mechanism, wherein the part (a) is a view of the shake correction mechanism when it is observed from a side opposite to an image pickup surface of an image pickup device (back surface side), and the part (b) is a fragmentary view of the shake correction mechanism taken along a line A-A.

Figure 5:
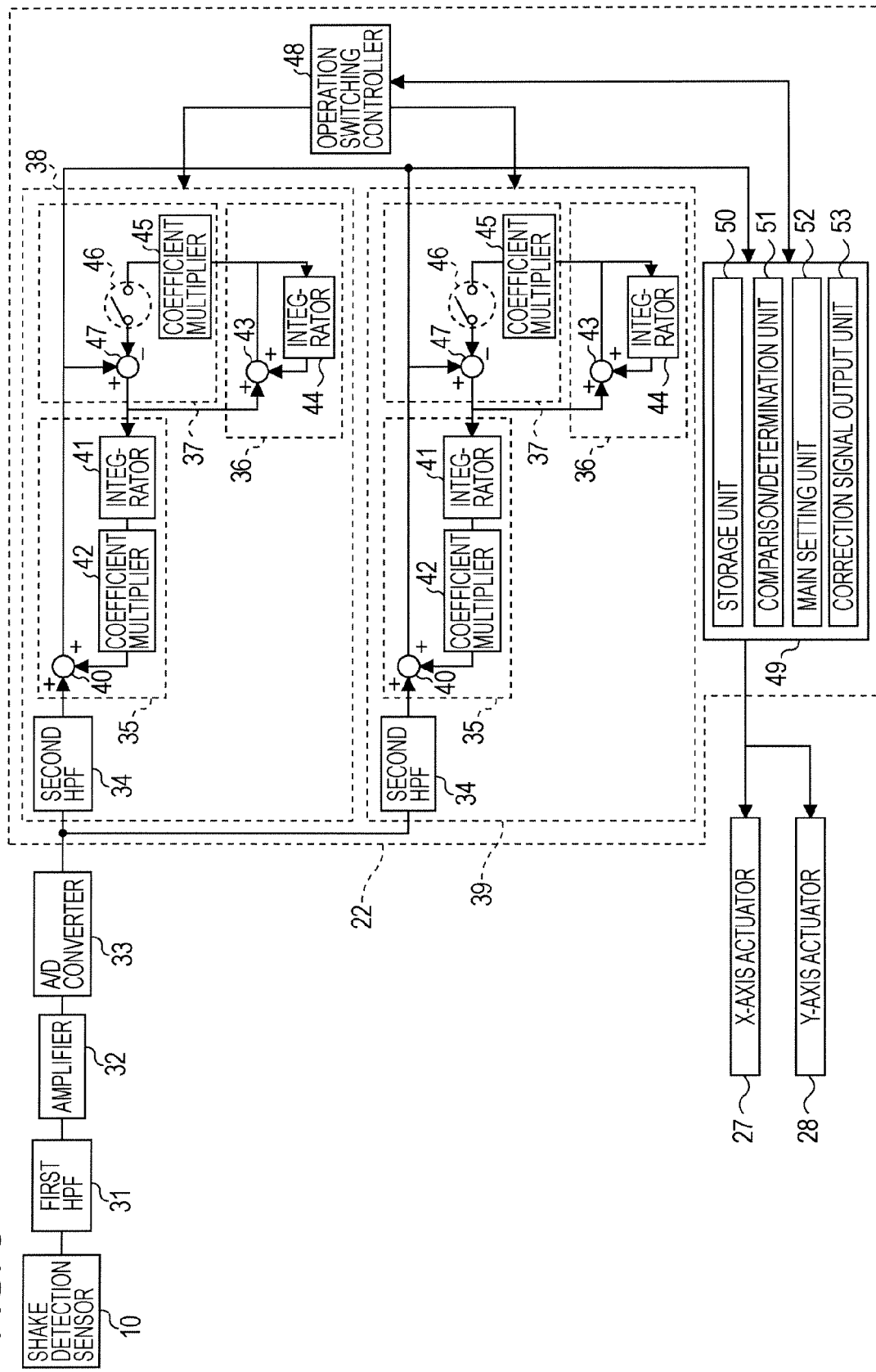

FIG. 5 is a block diagram showing an electric arrangement according to a shake correcting operation in the image pickup apparatus.

Figure 6:
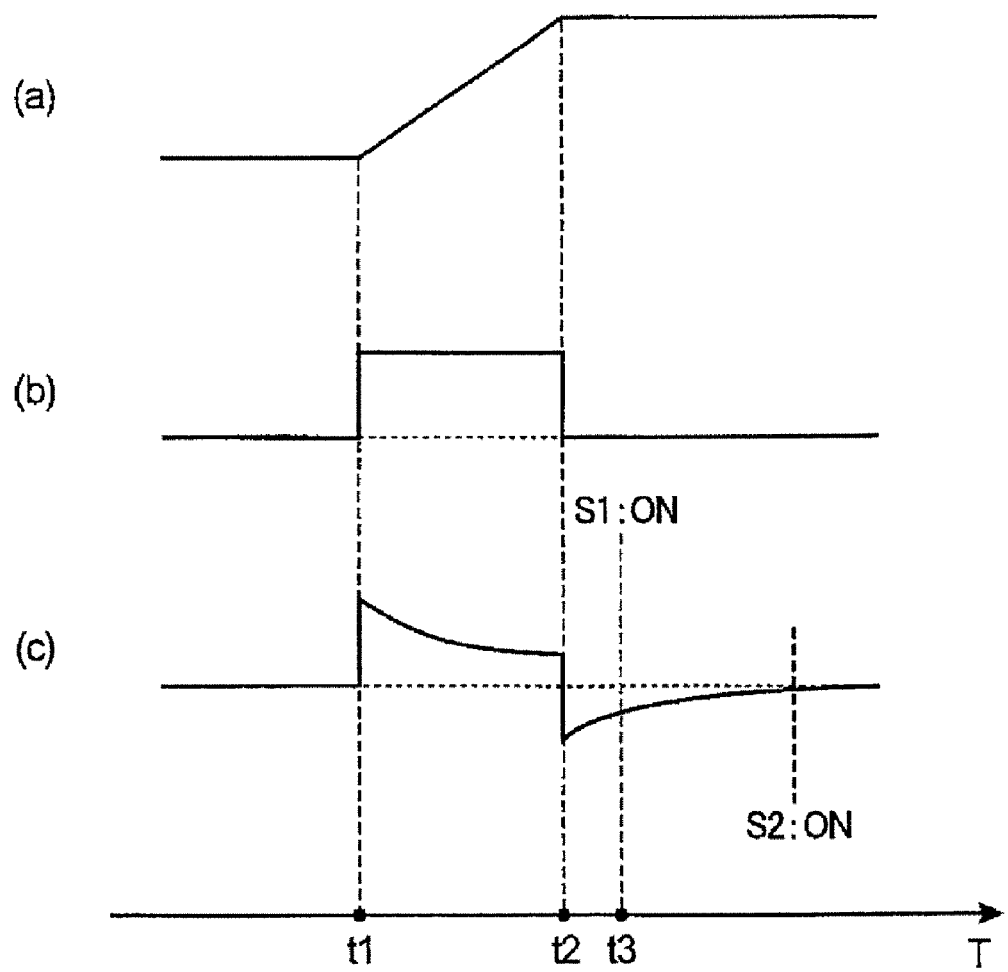

A part (a) of FIG. 6 is a graph showing a change of a rotation angle of the image pickup apparatus when a panning operation is carried out to the image pickup apparatus, wherein the horizontal axis shows a time T, a part (b) of FIG. 6 is a graph showing a change of the output from a shake detection sensor when the panning operation shown in the part (a) of FIG. 6 is carried out, and a part (c) of FIG. 6 is a graph showing a change of the output from a first HPF when the output shown in the part (b) of FIG. 6 is supplied from the shake detection sensor.

Figure 7:
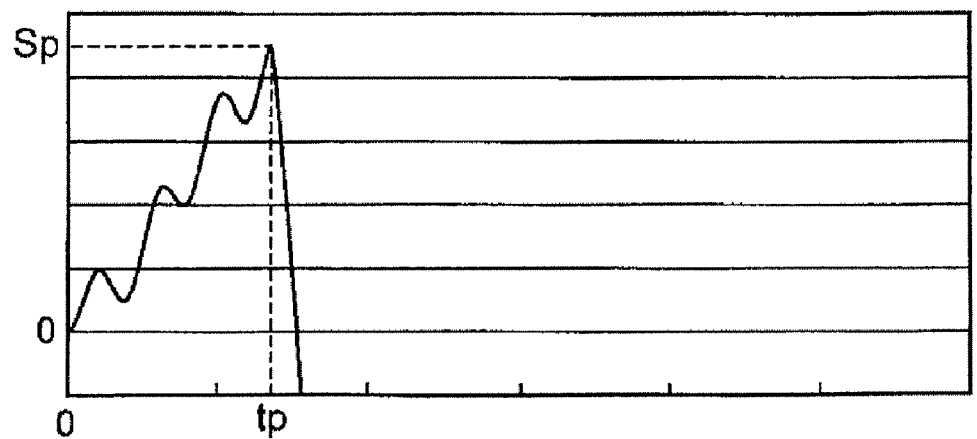

FIG. 7 is a view showing a change of the output value from a second integration unit.

Figure 8:
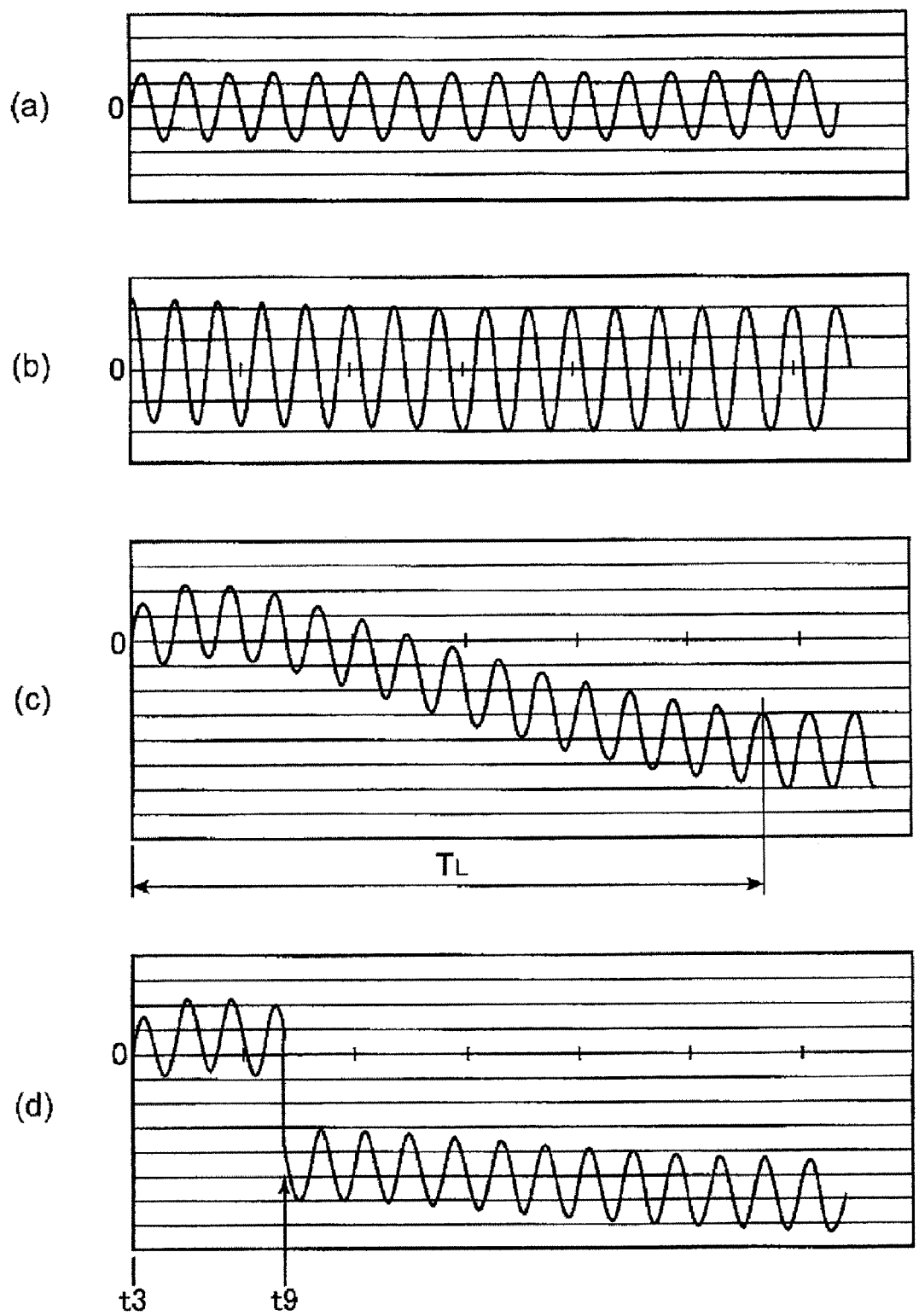

A part (a) of FIG. 8 is a graph showing an shake angle applied to the image pickup apparatus, a part (b) of FIG. 8 of is a graph showing the output from the first HPF, and a part (c) of FIG. 8 is a graph showing a result of experiment of a shake angle calculated by the first the integration unit in a conventional arrangement.

Figure 9:
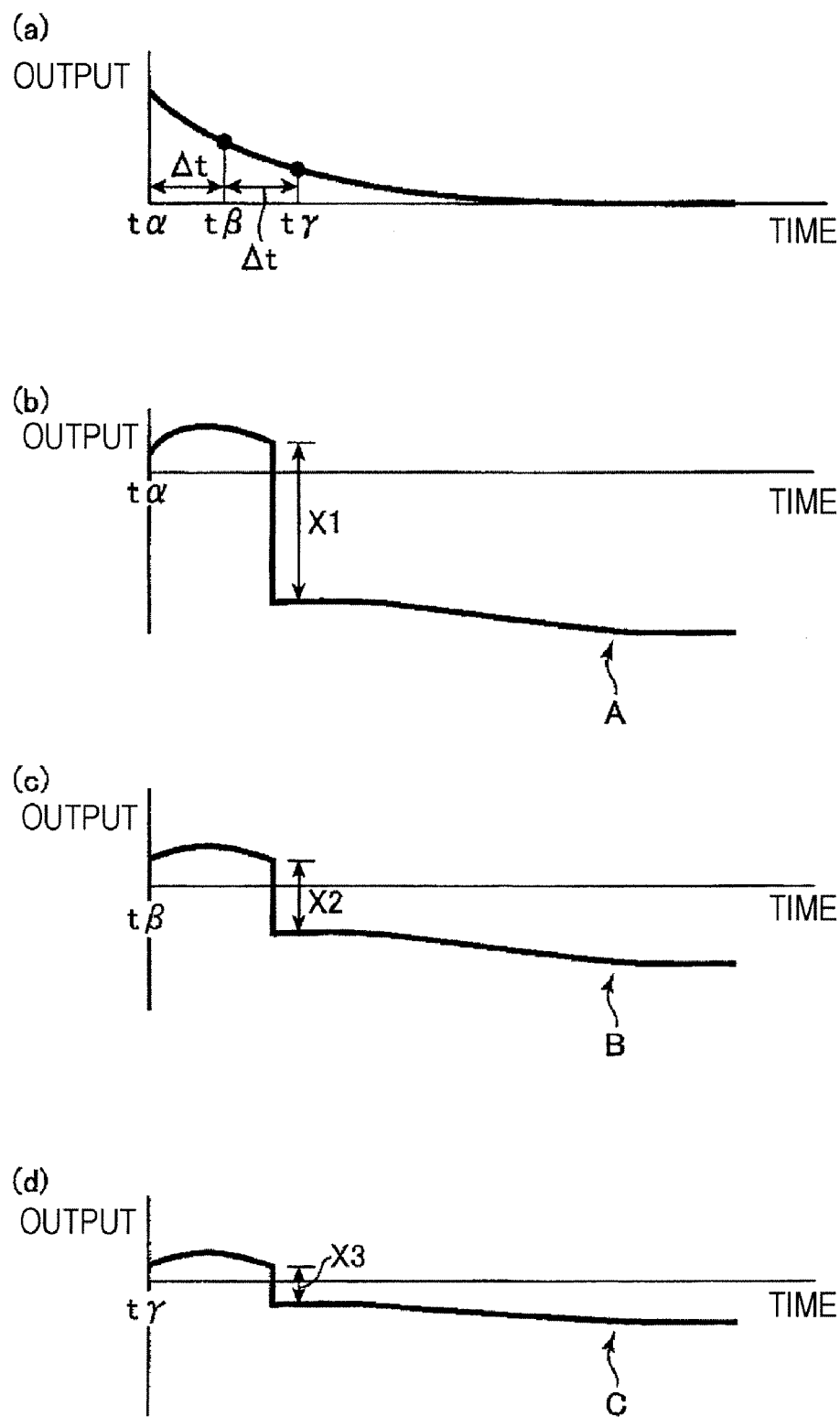

A part (a) of FIG. 9 is a view of an output waveform of the first HPF, a part (b) of FIG. 9 is a view showing the output from a shake correction amount deriving unit when a shake detecting operation is carried out at a time T=tα of the part (a), a part (c) of FIG. 9 is a view showing the output from the shake correction amount deriving unit when a shake detecting operation is carried out at a time T=tβ of the part (a), and a part (d) of FIG. 9 is a view showing the output from the shake correction amount deriving unit when a shake detecting operation is carried out at a time T=tγ of the part (a).

Figure 10:
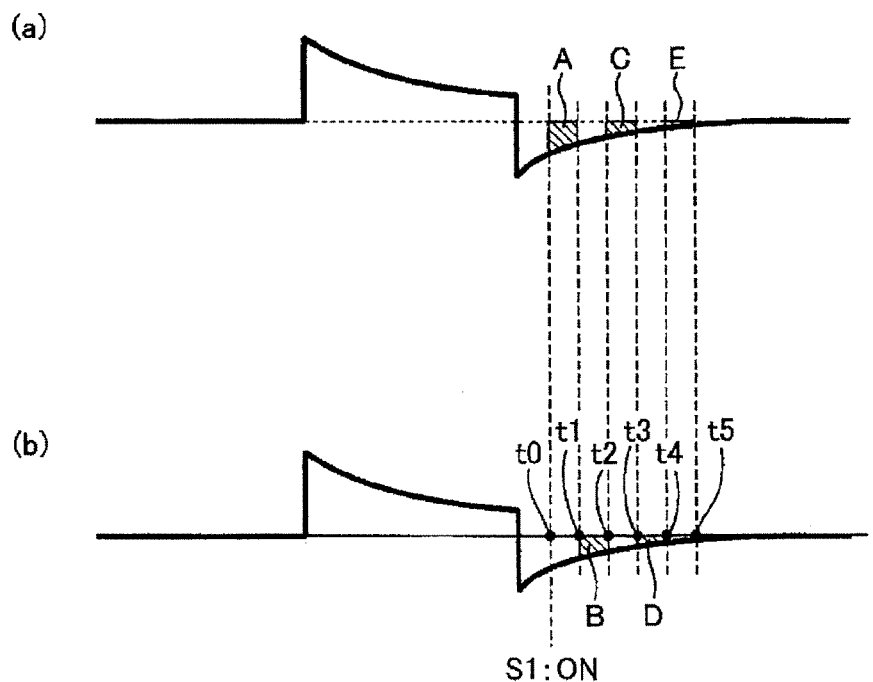

Parts (a) and (b) of FIG. 10 are views explaining operations of first and second shake correction amount deriving units.

Figure 11:
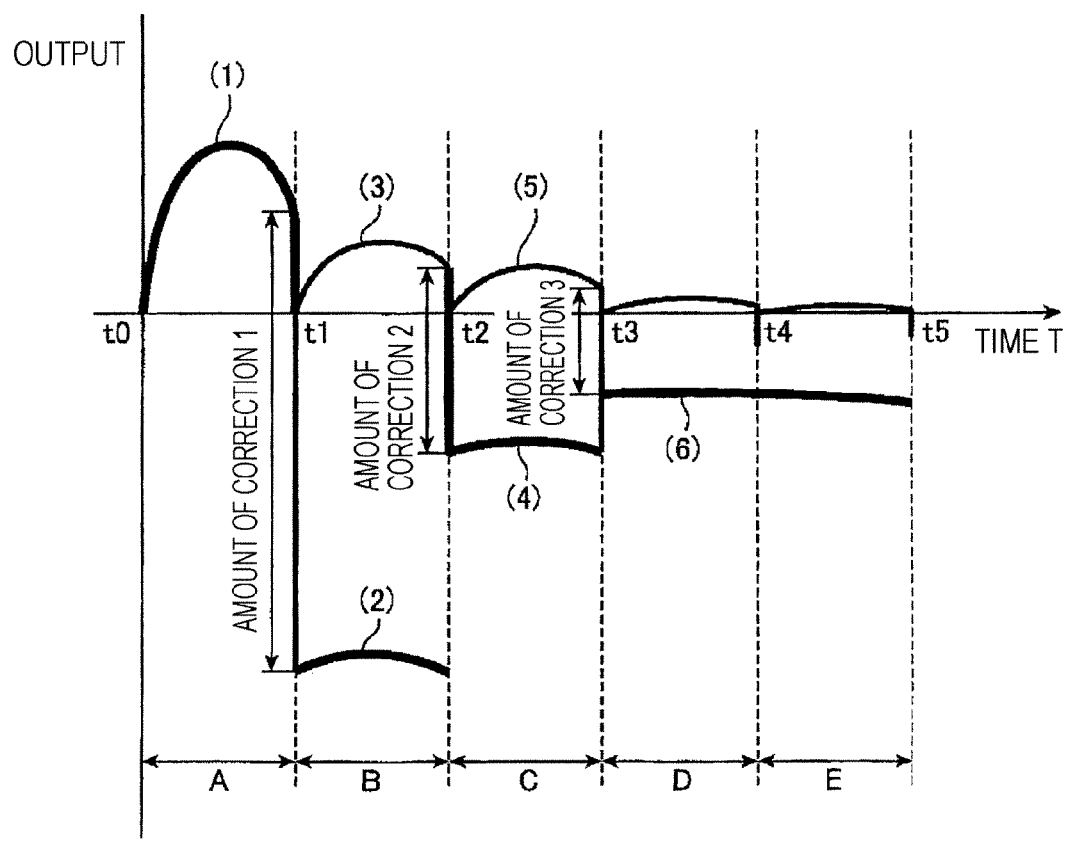

FIG. 11 is a view explaining an operation of a drive signal creating unit.

Figure 12:
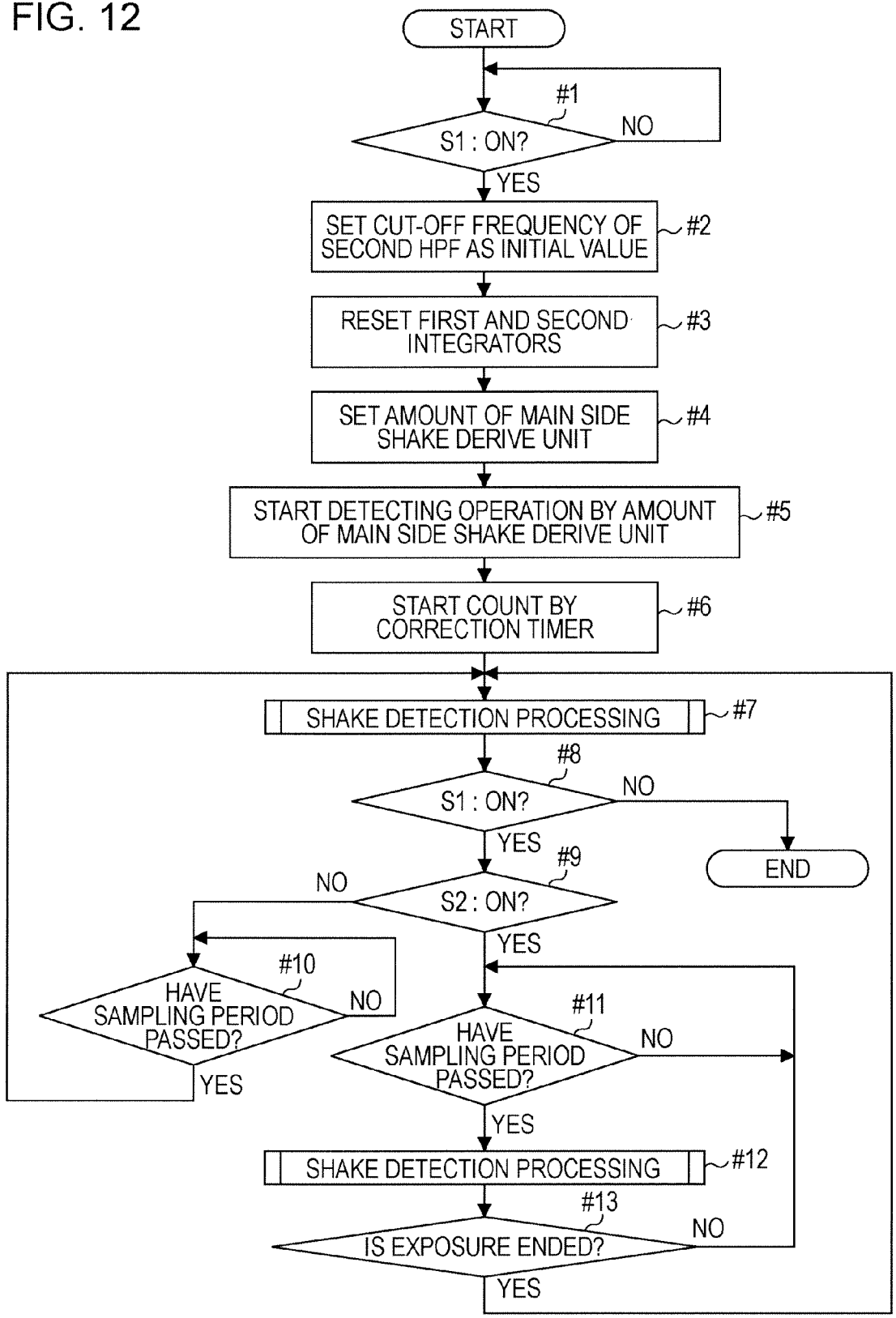

FIG. 12 is a flowchart showing a shake correction processing of the image pickup apparatus 1.

Figure 13:
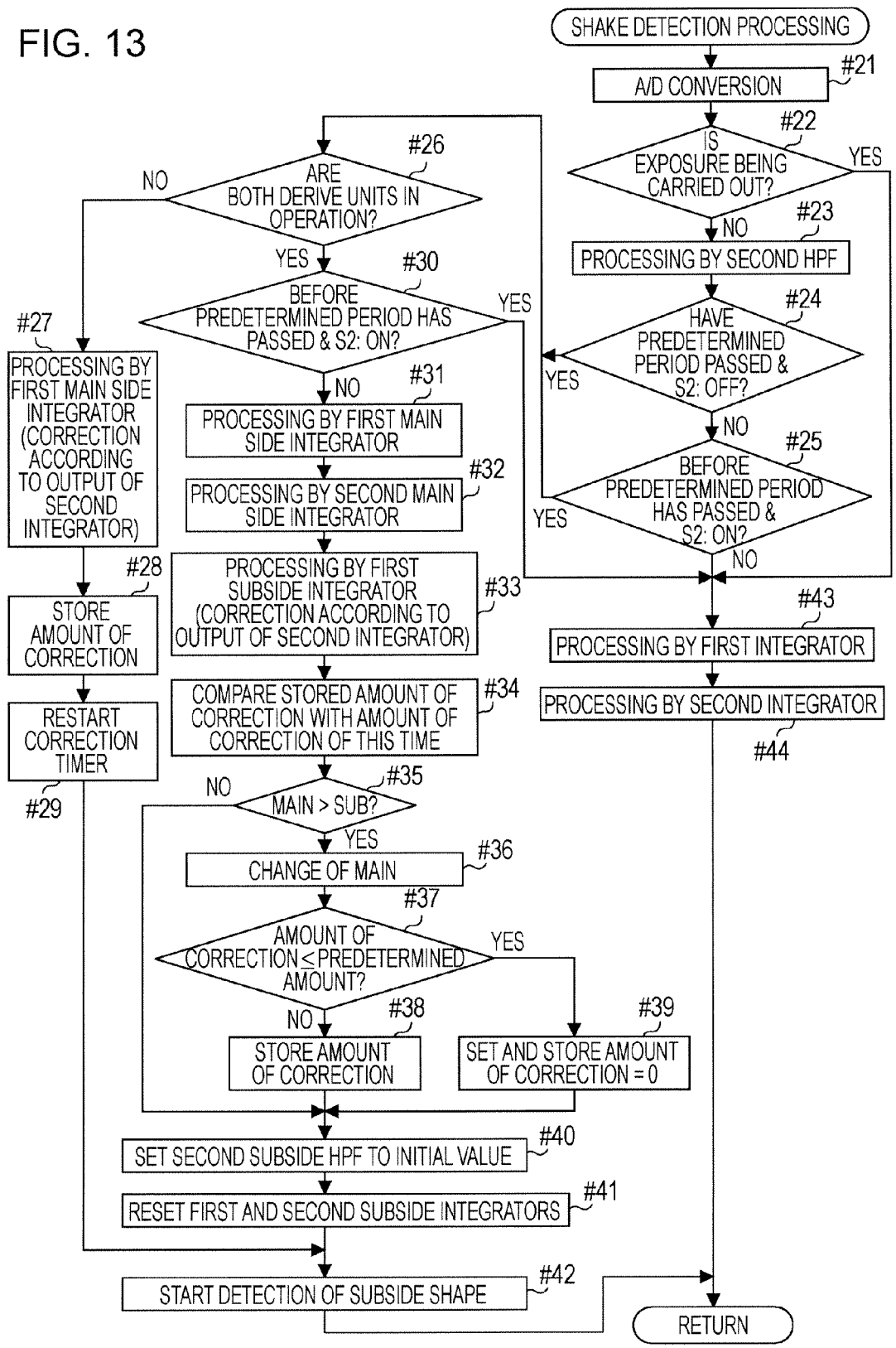

FIG. 13 is a flowchart showing a subroutine of shake detection processings at steps #7, #12 of FIG. 12.

BEST MODE FOR CARRYING OUT THE INVENTION

Figure 1:
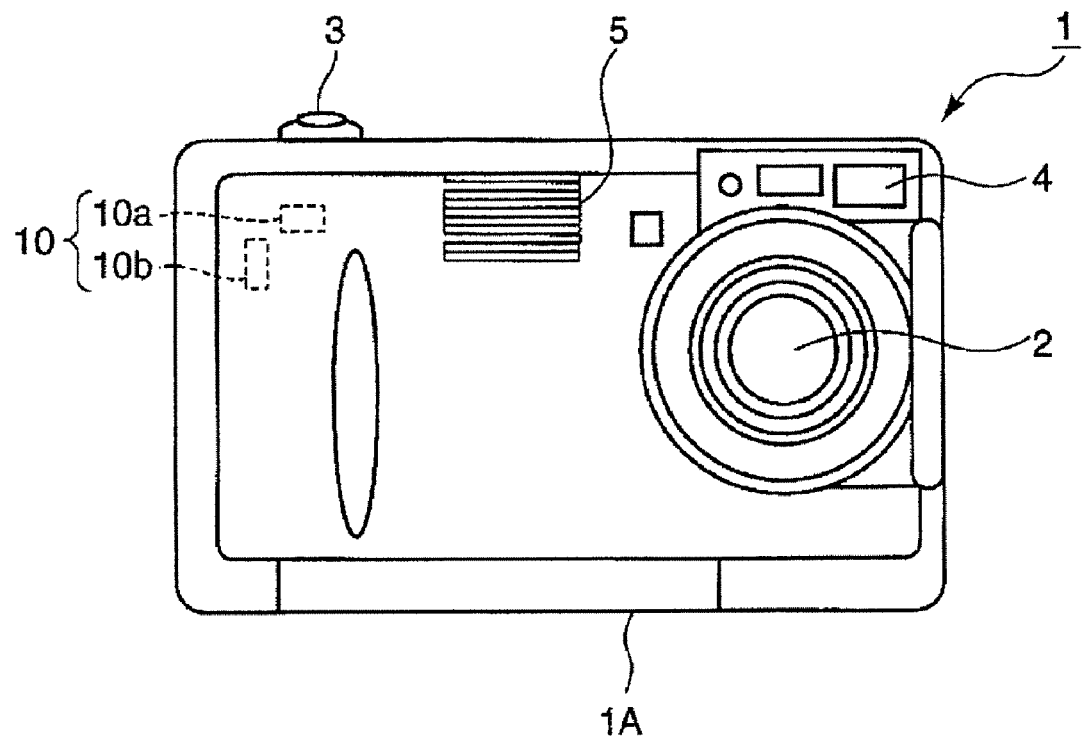
FIG. 1 is a front elevational view of an embodiment of an image pickup apparatus according to the present invention.
Figure 2:
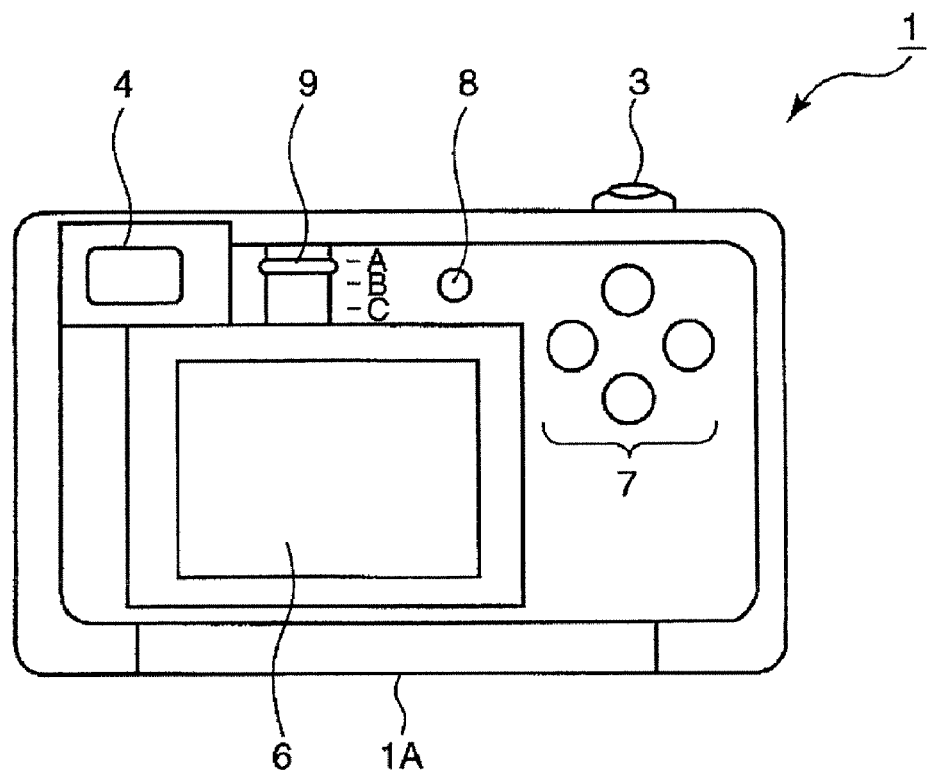
FIG. 2 is a back surface view of the image pickup apparatus.

An embodiment of an image pickup apparatus according to the present invention will be explained. FIG. 1 is a front elevational view of the image pickup apparatus 1, and FIG. 2 is a back surface view thereof. Note that, in FIGS. 1 and 2, the same components and the like are denoted by the same reference numerals.

As shown in FIGS. 1 and 2, the image pickup apparatus 1 includes an apparatus main body 1A provided with an image pickup optical system 2, a shutter button 3, an optical finder 4, a flash 5, an LCD (Liquid Crystal Display) 6, a function switch group 7, a power supply button 8, a mode setting switch 9, and a shake detection sensor 10.

The image pickup optical system 2 is disposed at an appropriate position on a front surface of the apparatus main body 1A and forms an optical image of a subject. The image pickup optical system 2 includes a zoom lens group 12 for changing an image pickup view angle (refer to FIG. 3), a focus lens group 13 for carrying out focus adjustment (refer to FIG. 3), and the like and changes a focal length and adjusts a focus position.

The shutter button 3 is depressed in two steps (half depression and full depression) and instructs a timing of an exposure control. The image pickup apparatus 1 has a still image pickup mode for picking up a still image and a moving image pickup mode for picking up a moving image, and when the shutter button 3 is not operated when the still image pickup mode and the moving image pickup mode are set, an image of a subject (live view image) is updated at a predetermined cycle, for example, every 1/30 (second) and displayed on the LCD 6.

Note that the live view image is an image which is picked up by the image pickup device 14 (refer to FIG. 3) and switchingly displayed on the LCD 6 at the predetermined cycle (for example, 1/30 second) during a period until the image is recorded (image pickup preparation period). A state of the subject is displayed on the LCD 6 at an approximately real time due to the live view image, thereby a photographer can confirm the state of the subject on the LCD 6.

Figure 3:
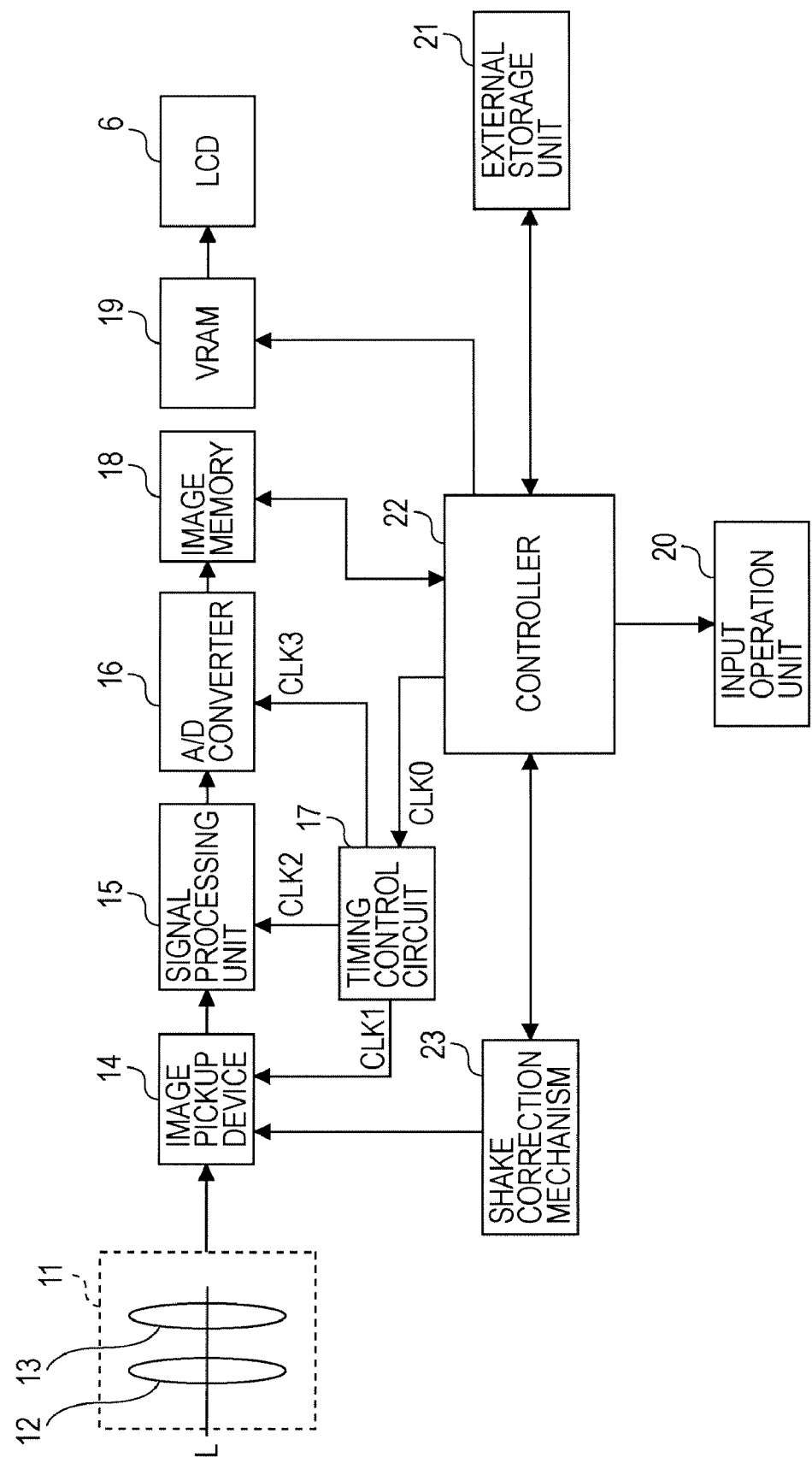
FIG. 3 will explain an electric arrangement of the image pickup apparatus.

Further, when the shutter button 3 is half-depressed in still image pickup mode, there is set an image pickup waiting state in which exposure control values (shutter speed and aperture value) and the like are set, and when the shutter button 3 is fully depressed, the image pickup device 14 starts an exposure operation (recording exposure operation) to create an image of the subject to be recorded to an external storage unit 21 (refer to FIG. 3).

When the shutter button 3 is fully depressed in the moving image pickup mode, the recording exposure operation is started, an image is created by pixel signals periodically fetched from the image pickup device 14, and when shutter button 3 is full depressed again, the recording exposure operation is stopped.

The half depressing operation of the shutter button 3 is detected by that a not shown switch S1 is turned on (S1: ON), and the full depressing operation of the shutter button 3 is detected by that a not shown switch S2 is turned on (S2: ON).

The optical finder 4 is disposed at an appropriate position on a back surface of the apparatus main body 1A and optically displays a range in which the subject is picked up. The flash (built-in flash) 5 is disposed in an upper central portion on a front surface of the apparatus main body 1A, and when an amount of exposure light to the image pickup device 14 is insufficient, and the like, it irradiates illuminating light to the subject by discharging a not shown discharge lamp.

The LCD 6 is disposed in an approximately central portion on the back surface of the apparatus main body 1A and includes a color liquid crystal panel. The LCD 6 displays an image picked up the image pickup device 14 and replays and displays a recorded image as well as displays screens for setting functions and modes mounted on the image pickup apparatus 1.

The function switch group 7 is disposed on a right side of the LCD 6 and composed of a zoom switch for driving the zoom lens group 12 (refer to FIG. 3) in a wide direction or a telescopic direction, a focus switch for driving the focus lens group 13 for adjusting a focus point in an optical axis direction, and the like.

The power supply button 8 is disposed on a left side of the function switch group 7 on the back surface of the apparatus main body 1A and alternately turns on and off a main power supply each time it is depressed.

The mode setting switch 9 is disposed in an upper portion of the back surface of the apparatus main body 1A and switches a mode between a "still image pickup mode" in which a still image of the subject is picked up, a "moving image pickup mode" in which a moving image of the subject is picked up, and a "replay mode" in which a picked up image recorded to the external storage unit 21 is replay and displayed on the LCD 6. The mode setting switch 9 is composed of a slide switch with three contact points that sides in an up/down direction. When the mode setting switch 9 is set to a lower position (position "C"), the image pickup apparatus 1 is set to the replay mode, when it is set to a central position (position "B"), it is set to the still image pickup mode, and when it is set to an upper position (position "A"), it is set to the moving image pickup mode.

The shake detection sensor 10 is built in the apparatus main body 1A at an appropriate position thereof. When a two-dimensional coordinate system having an X-axis in a horizontal direction of FIG. 1 and a Y-axis in a vertical direction to the X-axis is assumed, the shake detection sensor 10 is composed of an X sensor 10 for detecting apparatus shake in an X-axis d1irection and a Y sensor 10b for detecting apparatus shake in a Y-axis direction. Each of the X and Y sensors 10a, 10b is composed of a gyro using, for example, a piezoelectric device, and they detect angular speeds of shake in respective directions. The shake detection sensor 10 is an example of shake detection means in the claims.

Next, an electric arrangement of the image pickup apparatus 1 will be explained with reference to FIG. 3. Note that the same components and the like as those of FIGS. 1 and 2 are denoted by the same reference numerals.

An LCD 6 corresponds to the LCD 6 shown in FIG. 2. An image pickup optical system 2 is composed of a zoom lens group 12 and a focus lens group 13.

An image pickup device 14 is disposed such that a light receiving surface thereof is orthogonal to the optical axis of the image pickup optical system 2 in a region on a back surface side of an apparatus main body 1A. The image pickup device 14 is a CCD (Charge Coupled Device) color area sensor having a bayer arrangement in which a plurality of photoelectric conversion devices (hereinafter, called pixels) each composed of, for example, a photodiode are two-dimensionally disposed in a matrix state, and color filters of R (red), G (green), B (blue) each having a different spectroscopic characteristic are disposed on light receiving surfaces of the respective photoelectric conversion devices at a rate of 1:2:1. The image pickup device 14 converts an optical image of a subject imaged by the image pickup optical system 2 into analog electric signals having respective R (red), G (green), B (blue) color components and outputs the electric signals as pixel signals of respective R, G, B colors. Note that a CMOS image sensor, a VMIS image sensor, and the like may be employed as the image pickup device 14 in addition to a CCD image sensor.

The image pickup device 14 carries out image pickup operations such as start and end of an exposure control, readout of the pixel signals of respective pixels (horizontal synchronization, vertical synchronization, transfer), and the like under the control of a timing control circuit 17 to be described later.

A signal processing unit 15 subjects the analog pixel signals output from the image pickup device 14 to a predetermined analog signal processing. The signal processing unit 15 has a CDS (correlative double sampling) circuit and an AGC (automatic gain control) circuit, reduces the noise of the pixel signals through the CDS circuit, and adjusts the level of the pixel signals through the AGC circuit.

An A/D converter 16 converts the analog R, G, B pixel signals output from the signal processing unit 15 into digital pixel signals (hereinafter, referred to as pixel data) each composed of a plurality of bits (for example, 10 bits).

A timing control circuit 17 creates clocks CLK1, CLK2, CLK3 based on a reference clock CLK0 output from a controller 22 and outputs the clock CLK1 to the image pickup device 14, the clock CLK2 to the signal processing unit 15, and the clock CLK3 to the A/D converter 16, respectively to thereby control the operations of the image pickup device 14, the signal processing unit 15, and the A/D converter 16.

An image memory 18 is a memory that temporarily stores the pixel data output from the A/D converter 16 when the image pickup mode is set as well as is used as a working region in which the pixel data is subjected to various processings by the controller 22. Further, the image memory 18 is a memory for temporarily storing the pixel data read out from the external storage unit 21 when the replay mode is set.

A VRAM 19 is a buffer memory of image signals constituting an image replayed and displayed on the LCD 6 and has a recording capacity of image signals corresponding to the number of pixels of the LCD 6.

An input operation unit 20 includes the shutter button 3, the function switch group 7, the power supply button 8, and the mode setting switch 9 which are described above and inputs the operation information of them to the controller 22. The external storage unit 21 is composed of a memory card and a hard disc and stores the images created by the controller 22.

The controller 22 is composed of a microcomputer in which a memory units, for example, a ROM (Read Only Memory) for storing a control program, a flash memory for temporarily storing data, and the like are built in, and integrally controls the image pickup operation of the image pickup apparatus 1 by controlling the drives of the respective components in the apparatus main body 1A described above by associating them with each other.

When the image pickup apparatus 1 picks up an image telescopically or in a dark portion (in which a long time exposure is required) in a handheld fashion, there is a possibility that "shake" such as hand-shake and the like occurs. To ensure reliable photography, the image pickup apparatus 1 is provided with a so-called hand-shake correcting function for correcting an optical axis L, which is dislocated by shake applied to the image pickup apparatus 1 by hand-shake and the like caused by a user by appropriately moving (swinging) the image pickup apparatus 1 according to the shake thereof.

The controller 22 has a function for deriving a shake correction amount to correct (cancel) the shake applied to the image pickup apparatus 1.

A shake correction mechanism 23 realizes the hand-shake correcting function and corrects the positional dislocation of the optical axis L by driving the image pickup device 14 on a plane orthogonal to the optical axis of the image pickup optical system 2 based on the shake correction amount derived by the controller 22.

Parts (a) and (b) of FIG. 4 are views showing an example of an arrangement of the shake correction mechanism 23, wherein the part (a) is a view of the shake correction mechanism 23 when it is observed from a side opposite to an image pickup surface of the image pickup device 14 (back surface side), and the part (b) is a fragmentary view of the shake correction mechanism 23 taken along a line A-A. Note that, as shown in the part (a) of FIG. 4, it is assumed that a two dimensional coordinate system is set such that the respective sides of the system face in the directions of X- and Y-axes with respect to the image pickup surface of the image pickup device 14.

The shake correction mechanism 23 is composed of a first substrate 24, a second substrate 25, and a third substrate 26 each having an approximately square shape, and an X-axis actuator 27 and a Y-axis actuator 28. The first substrate 24 is a hollow member fixed to the apparatus main body 1A, and the X-axis actuator 27 is attached at an upper central position on a back surface of the first substrate 24. The second substrate 25 is a hollow member coupled with the X-axis actuator 27. The Y-axis actuator 28 is attached at a central position of one side on a front surface of the second substrate 25. The third substrate 26 is a sheet-shaped member coupled with the Y-axis actuator 28, and the image pickup device 14 is fixed to a front surface of the third substrate 26. Note that the movements of the second and third substrates 25, 26 in X-axis and Y-axis directions are guided by not shown rail members at predetermined positions.

The second substrate 25 has a projecting portion 25a projecting upward from a central position of an upper edge thereof, and a slider 29 is formed on the surface of the projecting portion 25a on the first substrate 24 side thereof integrally therewith. Then, the first substrate 24 is coupled with the second substrate 25 through friction coupling of the slider 29 with a drive shaft 30 of the X-axis actuator 27, thereby the second substrate 25 can relatively move in the X-axis direction with respect to the first substrate 24.

Further, the slider 29 is formed on the surface of the second substrate 25 on the first substrate 24 side thereof at a central portion on one side of the surface integrally therewith, and the third substrate 26 is coupled with the second substrate 25 through the Y-axis actuator 28 through friction coupling of the slider 29 with a drive shaft 30 of the Y-axis actuator 28, thereby the third substrate 26 can relatively move in the Y-axis direction with respect to the second substrate 25.

When a predetermined drive pulse is continuously applied to the X-axis and Y-axis actuators 27, 28 of the shake correction mechanism 23 having the arrangement as described above, the image pickup device 14 is moved in the X-axis and Y-axis directions. The image pickup apparatus 1 of the embodiment detects a shake amount and a shake direction of apparatus shake by the shake detection sensor 10 and starts to calculate a correction amount to the shake by turning on the switch S1 acting as a trigger and carries out a shake correcting operation using the shake correction mechanism 23 based on a result of calculation.

FIG. 5 is a block diagram showing an electric arrangement according to the shake correcting operation in the image pickup apparatus 1.

As shown in FIG. 5, the image pickup apparatus 1 has a shake detection sensor 10, an X-axis actuator 27, a Y-axis actuator 28, a first high-pass filter (hereinafter, referred to as a first HPF) 31, an amplifier 32, an A/D converter 33, and a controller 22.

The shake detection sensor 10 corresponds to the shake detection sensor 10 shown in FIG. 1, the X-axis and Y-axis actuators 27, 28 correspond to the X-axis and Y-axis actuators 27, 28 shown in FIG. 4.

The first HPF 31 is composed of, for example, a capacitor and a resistor device and cuts a predetermined low frequency component signal from the signal output from the shake detection sensor 10. A cutoff frequency is set to, for example, 0.3 kHz.

The amplifier 32 amplifies the output from the first HPF 31, and the A/D converter 33 converts the analog signal output from the amplifier 32 into a digital value.

The controller 22 corresponds to the controller 22 shown in FIG. 3 and functionally includes a first shake correction amount deriving unit 38, a second shake correction amount deriving unit 39, an operation switch controller 48, and a drive signal creating unit 49.

The first and second shake correction amount deriving units 38, 39 have approximately the same arrangement and function, and each of them is composed a second HPF 34, a first integration unit 35, a second integration unit 36, and a correction unit 37.

The second HPF 34 cuts predetermined low frequency component and direct current component signals mainly generated by the characteristics and the like of the amplifier 32 and the A/D converter 33. A cutoff frequency of the second HPF 34 is variable from, for example, 0.9 kHz to 0.1 kHz.

The first integration unit 35 creates a shake angle signal based on the output from the second HPF 34 and outputs it to the drive signal creating unit 49 and is composed of an adder 40, an integrator 41, and a coefficient multiplier 42.

The adder 40 adds the output from the second HPF 34 to the output from the coefficient multiplier 42.

The integrator 41 integrates the output from the adder 40. As described below, the correction unit 37 includes a switch unit 46. When the switch unit 46 is turned off, since the correction unit 37 carries out no correction processing, the output from the adder 40 is input to the integrator 41 as it is, and the integrator 41 integrates the output from the adder 40. In contrast, when the switch component 46 is turned on, since the correction unit 37 carries out a correction processing, a result obtained by subjecting the output from the adder 40 to the correction processing is input to the integrator 41, and thus the integrator 41 integrates the output value after it is corrected.

The coefficient multiplier 42 multiplies the output from the integrator 41 by a predetermined coefficient K equal to or less than 1 and outputs the multiplied value to the adder 40. When it is assumed that the input value of this time to the coefficient multiplier 42 (the output value from the integrator 41) is shown by X, the coefficient by which the input value is multiplied by the multiplier 42 is shown by K, and the output value from the second HPF 34, which is assumed constant, is shown by Y, the output Z from the first integration unit 35 has a constant value when $X(1-K)=Y$ is satisfied.

The image pickup apparatus 1 of the embodiment has the first HPF 31 composed of the capacitor and the resistor device. Accordingly, when the output signal from the shake detection sensor 10 includes a relatively large amount of a direct current component signal due to a panning operation carried out to, for example, the image pickup apparatus 1, the first HPF 31 outputs a direct current component signal of an inverse polarity.

A part (a) of FIG. 6 is a graph showing a change of a rotation angle of the image pickup apparatus 1 when a panning operation is carried out to the image pickup apparatus 1, wherein the horizontal axis shows a time T, a part (b) of FIG. 6 is a graph showing a change of the output from the shake detection sensor 10 when the panning operation shown in the part (a) is carried out, and a part (c) of FIG. 6 is a graph showing a change of the output from the first HPF 31 when the output shown in the part (b) of FIG. 6 is supplied from the shake detection sensor 10. Note that FIG. 6 does not show the influence of shake (hand shake) applied to the image pickup apparatus 1.

As shown in the part (a) of FIG. 6, when a panning operation is carried out to the image pickup apparatus 1 from a time T=t1 to a time T=t2 such that the rotation angle increases at a constant rate, the shake detection sensor 10 outputs a constant output value from the time T=t1 to the time T=t2 as shown in the part (b) of FIG. 6.

Further, when an output, which is shown by the waveform of the graph shown in the part (b) of FIG. 6, is output from the shake detection sensor 10, the output from the first HPF 31 gradually decreases up to the time after it instantly rises at the T=t1 as shown in the part (c) of FIG. 6. The output waveform of the shake detection sensor 10 from the time T=t1 to the time T=t2 is determined by a time constant based on the capacity of the capacitor and the resistance value of the resistor device disposed to the first HPF 31.

Further, after the output from the first HPF 31 instantly falls to a certain value of an inverse polarity at the time T=t2 at which the output from the shake detection sensor 10 falls from a predetermined value to 0, the output gradually increases and finally converges to a value (for example, 0) before the panning operation is carried out (the conversing value is shown by α).

It is assumed a case in which the switch S1 is turned on (the shutter button 3 is half depressed) at, for example, a time T=t3 at which the output from the first HPF 31 gradually increases as shown in the part (c) of FIG. 6.

Since a shake correcting operation is started by turning on the switch S1 acting as the trigger, when the shake correcting operation is started at the time T=t3, the integrator 41 creates an shake angle signal using the output from the first HPF 31 which has a certain value of an inverse polarity other than the converging value α as an initial value.

Conventionally, a false signal (erroneous shake angle signal) as if a panning operation is carried out is created regardless that no panning operation is actually carried out to the image pickup apparatus 1 at the time T=t3. When the switch S2 is turned on (the shutter button 3 is fully depressed) in the state in which the false signal is created, a shake correcting operation is carried out based on an erroneous result of detection (detected angle), thereby the image quality of a picked up image is deteriorated.

The second integration units 36 and the correction units 37 in the first and second shake correction amount deriving units 38, 39 are provided to solve the above problem, and the outputs from the first integration units 35 are corrected when a panning operation is carried out to the image pickup apparatus 1.

Each of the second integration unit 36 is composed of an adder 43 and an integrator 44. When the switch unit 46 is turned off, the adder 43 adds the output from the first integration unit 35 to the output from the integrator 44, whereas when the switch unit 46 is turned on, the adder 43 adds a result of the correction processing carried out by the correction unit 37 and the output from the integrator 44 to the output from the first integration unit 35. The integrator 44 integrates the output from the adder 43.

Each of the correction units 37 carries out a correction processing to the output from the first integration unit 35 using the output from the second integration unit 36 and is composed of a coefficient multiplier 45, a switch unit 46, and a subtracter 47.

The coefficient multiplier 45 multiplies the output from the second integration unit 36 by a predetermined coefficient (for example, 1%). The switch unit 46 determines whether or not a correction processing is carried out by the correction unit 37.

When the switch unit 46 is turned off, the subtracter 47 outputs the output from the first integration unit 35 to the integrator 41 of the first integration unit 35 as it is, whereas when the switch unit 46 is turned on, the subtracter 47 subtracts the output from the coefficient multiplier 45 in correction unit 37 from the output from the first integration unit 35 and outputs the subtracted value to the integrator 41 of the first integration unit 35.

FIG. 7 is a view showing a change of the output value from the second integration unit 36. As shown in FIG. 7, a waveform showing the output value from the second integration unit 36 is made to a waveform that increases in its entirety when, for example, the average value of the outputs from the first integration unit 35 is a positive value. Note that it shows that there is a period during which the output from the first integration unit 35 is temporarily made to a negative value that there is cyclically generated a period during which an integrated value temporarily decreases in an output waveform shown in FIG. 7.

When the switch unit 46 of the correction unit 37 is turned on at a certain time T=tp while the output value from the second integration unit 36 changes, a value (0.01×Sp), which corresponds to, for example, the above coefficient (1%) of an integrated value Sp at the time is set as a correction value, and the output from the first integration unit 35 is corrected using the correction value, that is, the subtracter 47 subtracts the correction value from the output from the first integration unit 35.

An advantage obtained by correcting the output from the first integration unit 35 using the second integration unit 36 and the correction unit 37 as described above will be explained.

A part (a) of FIG. 8 is a graph showing a shake angle applied to the image pickup apparatus 1, a part (b) of FIG. 8 is a graph showing an output of the first HPF 31, and a part (c) of FIG. 8 is a graph showing a result of experiment of an shake angle (hereinafter, referred to as a calculated shake angle) calculated by the first integration portion in a conventional arrangement. Note that the lateral axes of the graphs shown in the parts (a) to (c) of FIG. 8 show a time, and the point of origin of the lateral axis corresponds to the time T=t3 of FIG. 6.

When it is assumed that shake as shown in the part (a) of FIG. 8 is applied to the image pickup apparatus 1 after the time T=t3, conventionally, the center of amplitude of the waveform of the shake calculation angle calculated by the first integration unit 35 relatively largely changes in a relatively long time TL, and then the waveform is made to an approximately stable waveform after the time has passed as shown in the part (c) of FIG. 8.

When the switch S2 is turned on (the shutter button 3 is fully depressed) in the relatively long time TL during which the waveform of the shake calculation angle calculated by the first integration unit 35 changes as described above, a shake correction amount is calculated based on a result of detection (shake calculation angle) different from actual shake, and an erroneous shake correcting operation is carried out, from which a problem arises in that the image quality of a picked up image is deteriorated.

In the embodiment, the output from the first integration unit 35 is corrected using the output from the second integration unit 36 by turning on the switch unit 46 of the correction unit 37 after a predetermined period of time has passed from the timing at which detection of shake is started.

A part (d) of FIG. 8 is a graph showing a result of experiment of a calculated shake angle when a correcting operation is carried out after a predetermined time has passed from the timing at which detection of shake is stated when the shake shown in the part (a) of FIG. 8 is applied to the image pickup apparatus 1.

As shown in the part (d) of FIG. 8, the calculated shake angle has the same waveform as that shown in the part (c) of FIG. 8 until the switch unit 46 is turned on. However, it can be found that the calculated shake angle is immediately made to a stable waveform within a predetermined range after it relatively largely decreases instantly because a correction value is added to the output from the first integration unit 35 at the timing at which the switch unit 46 is turned on (time T=t9).

Accordingly, when the waveform of the calculated shake angle is offset using a predetermined arrangement so that the center of amplitude thereof is made to approximate zero after the timing (time T=t9) at which the switch unit 46 is turned on, a waveform near to the waveform of the shake angle of the shake actually applied to the image pickup apparatus 1 (the part (a) of FIG. 8) can be obtained.

As a result, shake can be corrected based on a calculated shake angle that is faithful to the waveform of the shake angle of the shake actually applied to the image pickup apparatus 1 even if the switch S2 is turned on at any timing. Thus, it can be prevented or suppressed that an erroneous shake correction amount is calculated based on a result of detection different from actual shake as in a conventional calculation, thereby a more accurate shake correcting operation can be carried out. The first and second shake correction amount deriving units 38, 39 have the function described above, respectively.

Further, in the embodiment, the output from the first HPF 31 gradually increases and converges to a value (for example, 0) before the panning operation is carried out finally after the output from the shake detection sensor 10 falls to a certain value of an inverse polarity. Accordingly, the first and second shake correction amount deriving units 38, 39 are alternately operated in every short period composed of a time shorter than a period up to the timing at which it is contemplated that the output from the first HPF 31 is approximately stabilized after the switch S1 is turned on, and the correction amounts of the respective correction units 37 of the first and second shake correction amount deriving units 38, 39 are alternately employed. Then, the shake correction amount signals, which are obtained by carrying out a correction to the outputs from the first integration units 35 using the correction amounts employed to the outputs from the first integrators 35, are employed as drive signals to be output to the X-axis and Y-axis actuators 27, 28.

With this arrangement, a shake correction amount deriving unit, which is operated later than a shake correction amount deriving unit operated just before it can derive a shake correction amount based on a state in which the first HPF 31 has a smaller output error. As a result, it is possible to decrease a shake correction error after the panning operation is finished.

More specifically, when the output (absolute value) from the first HPF 31 gradually decreases as shown in a part (a) of FIG. 9, a correction amount X1, which is used by the correction unit 37 after a predetermined period of time has passed when a shake detecting operation (integrating operation carried out by the shake correction amount deriving unit) is started at a time T=tα at which the output from the first HPF 31 is made to have an inverse polarity, a correction amount X2, which is used by the correction unit 37 when a shake detecting operation is started at the time T=tβ which has passed a predetermined period of time Δt from the time T=tα, and a correction amount X3 of the correction unit 37 when a shake detecting operation is started at the time T=tγ which has passed the predetermined period of time Δt from the time T=tβ have a relation of X1>X2>X3. This is because as the shake correction amount can be derived in a state that the first HPF 31 has a smaller output error as the shake detecting operation (integrating operation) is started at a later time.

Further, as shown by arrows A to C of parts (b) to (d) of FIG. 9, as a shake detecting operation is started at a timing later than the time T=tα at which the output from the first HPF 31 is made to have the inverse polarity, the derived shake correction amount has an output waveform near to a flat (horizontal) waveform. Accordingly, when the waveform of this portion is offset using the predetermined arrangement so that the center of amplitude of the waveform is made to approximate zero, as the timing at which the shake detecting operation is started is later than the time T=tα at which the output from the first HPF 31 is made to have the inverse polarity, the waveform is made near to the waveform of the shake angle of the shake actually applied to the image pickup apparatus 1. Note that, the parts (b) to (d) of FIG. 9 do not show the influence of shake (hand-shake).

When it is assumed that the switch S1 is turned on at a time T=t0 as well as the output from the first HPF 31 is stabilized at a time T=t5 making use of the above mentioned as shown in parts (a) and (b) of FIG. 10 that show the waveforms of the outputs from the first HPF 31 similar to those of the part (c) of FIG. 6, the first shake correction amount deriving unit 38 carries out a shake detecting operation (integrating operation) during a short period A from the time T=t0 to a time T=t1 based on the signal output from the shake sensor 10, and the correction unit 37 carries out a correcting operation at the time T=t2.

The second shake correction amount deriving unit 39 carries a shake detecting operation (integrating operation) during a short period B from the time T=t1 to a time T=t2, and the correction unit 37 carries a correcting operation at the time T=t2. The first shake correction amount deriving unit 38 carries out a shake detecting operation (integrating operation) during a short period C from the time T=t2 to a time T=t3 based on the signal output from the shake detection sensor 10, and the correction unit 37 carries out a correcting operation at the time T=t3. Further, the second shake correction amount deriving unit 39 carries out a shake detecting operation (integrating operation) during a short period D from the time T=t3 to a time T=t4 based on the signal output from the shake detection sensor 10, and the correction unit 37 carries out a correcting operation at the time T=t4, and the first shake correction amount deriving unit 38 carries out a shake detecting operation (integrating operation) during a short period E from the time T=t4 to a time T=t5 based on the signal output from the shake detection sensor 10, and the correction unit 37 carries out a correcting operation at the time T=t5. Note that when the respective shake correction amount deriving units starts the shake detecting operations (integrating operations) during the respective periods, the settings of the respective units including the integrator 41 are cleared (returned to initial values).

With these operations, the shake corrections carried out during the respective periods are less influenced by the false signal and the waveforms of angles of shake become nearer to that of the shake angle of the shake actually applied to the image pickup apparatus 1 as a time passes. Note that the parts (b) to (d) of FIG. 10 do not also show the influence of shake (hand-shake).

To realize the above arrangement, the image pickup apparatus 1 is provided with a plurality of shake correction amount deriving units (in the embodiment, the first and second shake correction amount deriving units 38, 39) having approximately the same arrangement as well as provided with the operation switch controller 48 and the drive signal creating unit 49.

The operation switch controller 48 is used to control the operations of the first and second shake correction amount deriving units 38, 39. When the switch S1 is turned on as described above, the operation switch controller 48 first operates only the first shake correction amount deriving unit 38 as described above and operates also the second shake correction amount deriving unit 39 after a predetermined period of time (for example, 650 ms) has passed from the timing at which the switch S1 is turned on.

Thereafter, the operation switch controller 48 carries out a control so that a shake correction amount is derived after the correction unit 37 carries out a correction processing (to turn on the switch unit 46) in a shake correction amount deriving unit (hereinafter, referred to as a shake correction amount deriving sub side unit) set as a shake correction amount deriving sub unit by a main setting unit 52 to be described later. Note that the operation switch controller 48 controls a shake correction amount deriving unit set as a shake correction amount deriving main unit (hereinafter, referred to as an the shake correction amount deriving main side unit) so that it derives a shake correction amount without causing the correction unit 37 to carry out a correction processing (by turning off the switch unit 46).

The drive signal creating unit 49 includes a storage unit 50, a comparison/determination unit 51, the main setting unit 52, and a correction signal output unit 53.

The storage unit 50 stores the correction amount of a correction unit 37 of the shake correction amount deriving main side unit set by the main setting unit 52.

The comparison/determination unit 51 compares the absolute value of the correction amount of this time of the correction unit 37 in the shake correction amount deriving sub side unit with the absolute value of the correction amount of the correction unit 37, which is stored in the storage unit 50, in the shake correction amount deriving main side unit in each of the predetermined times (times corresponding to the respective short periods A to E shown in FIG. 10).

The main setting unit 52 sets the shake correction amount deriving unit, which outputs the signal of a shake correction amount to be employed as the drive signal of the X-axis and Y-axis actuators 27, 28, among the first and second shake correction amount deriving units 38, 39 as the shake correction amount deriving main side unit.

More specifically, when the switch S1 is turned on, the main setting unit 52 first sets the first shake correction amount deriving unit 38 as the shake correction amount deriving main side unit and sets the second shake correction amount deriving unit 39 as the shake correction amount deriving sub unit, respectively. Further, when the comparison/determination unit 51 determines that the absolute value of the correction amount of this time of the correction unit 37 in the shake correction amount deriving sub side unit is smaller than the absolute value of the correction amount of the correction unit 37, which is stored in the storage unit 50, in the shake correction amount deriving main side unit, the shake correction amount deriving sub side unit at the present is switched to and set as the shake correction amount deriving main unit. Otherwise, the shake correction amount deriving main side unit and the shake correction amount deriving sub side unit are maintained as they are.

The correction signal output unit 53 outputs the signal of the shake correction amount output from the shake correction amount deriving main side unit that is newly set by the main setting unit 52 to the X-axis and Y-axis actuators 27, 28 as the drive signal thereof.

FIG. 11 is a view explaining an operation of the drive signal creating unit 49, wherein the vertical axis shows the outputs from the first and second shake correction amount deriving units 38, 39, and the horizontal axis shows a time. Note that respective short periods A to E shown in FIG. 11 correspond to the respective short periods A to E shown in FIG. 10.

As shown in FIG. 11, first, the first shake correction amount deriving unit 38 is set as the shake correction amount deriving main side unit, a shake detecting operation is started by the first shake correction amount deriving unit 38 (integrating operations carried out by the first and second integration portions 35, 36) at a time T=t0, and a correction is carried out using the correction amount of the correction unit 37 ("correction amount 1" in FIG. 11) which is determined by the integrating operation carried out during the short period A up to the time T=t1 after a predetermined time has passed from the timing at which the shake detection is started. Further, the correction amount of the correction unit 37 is stored to the storage unit 50.

Note that, as explained in FIGS. 8 and 9, at the time T=t1, the output from the first shake correction amount deriving unit 38 is changed from an output shown by a waveform (1) to an output shown by a waveform (2) by a correction carried out by the correction unit 37, and a difference of the outputs from the first shake correction amount deriving unit 38 which instantly change at the time T=t1 corresponds to the correction amount of the correction unit 37 determined by the integrating operation carried out during the short period A. Further, a shake correcting operation is carried out until the first shake correction amount deriving unit 38 is switched as the shake correction amount deriving sub side unit after the time T=t1 (up to a time T=t2 to be described later) based on the shake correction amount (shake correction amount shown by a curve (2) of FIG. 11) by which the correction unit 37 carries out a correction without resetting an integrated value.

Next, at the time T=t1 the second shake correction amount deriving unit 39 also starts a shake detecting operation (integrating operations carried out by the first and second integrators 35, 36). The shake detecting operation is carried out based on the output from the first HPF 31 at the time T=t1. A curve (3) of FIG. 11 shows the output from the second shake correction amount deriving unit 39 during a short period B.

Then, the correction amount of the correction unit 37 ("correction amount 2" in FIG. 11), which is determined by the integrating operation carried out by the second shake correction amount deriving unit 39 during the short period B up to the time T=t2 is compared with the correction amount stored to the storage unit 50 ("correction amount 1" calculated at the time T=t1) at a time T=t2 which has passed a predetermined time from the time T=t1.

Since the shake detecting operation carried out by the second shake correction amount deriving unit 39 is started at a later time, that is, at a time at which the error of the output from the first HPF 31 is smaller than that at the time at which the first shake correction amount deriving unit 38 starts a shake detecting operation, the correction amount of the correction unit 37 in the second shake correction amount deriving unit 39 during the short period B is smaller than the correction amount of the correction unit 37 in the first shake correction amount deriving unit 38 during the short period A.

Further, unless the "correction amount 2" is not equal to or less than a predetermined value in which it is contemplated that the output from the first HPF 31 is approximately stabilized, the correction amount derived by the second shake correction amount deriving unit 39 during the short period B is employed as a drive signal of the X-axis and Y-axis actuators 27, 28 as well as the second shake correction amount deriving unit 39 is set as the shake correction amount deriving main side unit.

Further, the correction amount of the correction unit 37 in the second shake correction amount deriving unit 39, which is newly set as the shake correction amount deriving main side unit, is stored to the storage unit 50 so as to update a stored correction amount as well as the first shake correction amount deriving unit 38, which is newly set as the shake correction amount deriving sub side unit, is reset (reset of an integrated value).

Note that, at the time T=t2, the output from the second shake correction amount deriving unit 39 is changed from an output shown by a waveform (3) to an output shown by a waveform (4) by the correction carried out by the correction unit 37, and a difference of the outputs from the second shake correction amount deriving unit 39, which instantly change at the time T=t2, corresponds to the correction amount of the correction unit 37 which is determined by the integrating operation carried out during the short period B. Further, a shake correcting operation is carried out based on the shake correction amount (shake correction amount shown by the curve (4) of FIG. 11) corrected by the correction unit 37 without resetting the integrated value until the second shake correction amount deriving unit 39 is switched to and set as the shake correction amount deriving sub side unit after the time T=t2.

Next, the second shake correction amount deriving unit 39 carries out a shake detecting operation during a short period C from the time T=t2 to a time T=t3 at which a predetermined time has passed from the time T=t2 as well as a shake detecting operation is carried out after the integrated value is reset by the first shake correction amount deriving unit 38. A curve (5) of FIG. 11 shows the output from the first shake correction amount deriving unit 38 during the short period C.

Then, at the time T=t3, the correction amount ("correction amount 3" in FIG. 11) of the correction unit 37, which is determined by the integrating operation carried out by the first shake correction amount deriving unit 38 during the short period C up to the time T=t3, is compared with the correction amount stored to the storage unit 50 ("correction amount 2" calculated at the time T=t2).

Since the shake detecting operation of this time carried out by the second shake correction amount deriving unit 38 is started at a later time, that is, at a time at which the error of the output from the first HPF 31 is smaller than that at the time at which the first shake correction amount deriving unit 38 starts the shake detecting operation of the last time likewise the above mentioned, the correction amount of the correction unit 37 in the first shake correction amount deriving unit 38 during the short period C is smaller than the correction amount of the correction unit 37 in the second shake correction amount deriving unit 39 during the short period B.

Further, unless the "correction amount 3", by which it is contemplated that the output from the first HPF 31 is approximately stabilized, is not equal to or less than a predetermined value, processings similar to the various processings carried out at the time T=t2 are carried out. Further, when the "correction amount 3" becomes equal to or less than the predetermined value, since it is contemplated that the output from the first HPF 31 converges to a converged value α, the correction amount to be stored to the storage unit 50 is set to zero.

Further, after the "correction amount 3" becomes equal to or less than the predetermined value, a shake correcting operation is carried out by setting the correction amount of the correction unit 37 to zero. A curve (6) of FIG. 11 shows the output from the first shake correction amount deriving unit 38 after the short period D.

Note that when the delay time of a timing, at which the second shake correction amount deriving unit 39 starts a shake detecting operation, with respect to a timing, at which the first shake correction amount deriving unit 38 starts a shake detecting operation, is caused to agree with a time corresponding to a cycle of the correcting operation carried out by the correction unit 37, a time can be easily managed, thereby a time managing program can be simplified.

FIG. 12 is a flowchart showing a shake correction processing carried out in the image pickup apparatus 1.

As shown in FIG. 12, when the switch S1 is turned on by half depressing the shutter button 3 (YES at step #1), the second HPF 34 sets a cut-off frequency to a predetermined initial value (for example, 0.9 kHz) at step #2, and the first and second integration units 35, 36 are reset (step #3). Then, the shake correction amount deriving main side unit is set (step #4), and a shake detecting operation is started by the shake correction amount deriving main side unit (step #5).

Next, the correction timer starts counting (step #6). Then, the controller 22 and the like carry out a shake detection processing to be described later (step #7). When the switch S1 is not turned on (when the half-depressed shutter button 3 is released) (NO at step #8), a series of processings is finished. In contrast, when the switch S1 is continuously turned on (YES at step #8), it is determined whether or not the switch S2 is turned on (whether or not an instruction is issued to the exposure operation by fully depressing the shutter button 3) (step #9).

When the switch S2 is not turned on (NO at step #9), the controller 22 determines whether or not a sampling cycle (cycle in which the output from the shake detection sensor 10 is fetched, for example, 2 kHz) has passed (step #10). When the sampling cycle has not yet passed (NO at step #10), the controller 22 waits that the sampling cycle has passed. When the sampling cycle has passed (YES at step #10), the controller 22 returns to a processing at step #7.

In contrast, when the switch S2 is turned on at step #9 (YES at step #9), the controller 22 determines whether or not the sampling cycle has passed (step #11), and when the sampling cycle has not yet passed (NO at step #11), the controller 22 waits that the sampling cycle has passed, and when the sampling cycle has passed (YES at step #11), the controller 22 carries out a shake detection processing similar to that at step #7 (step #12) and determines whether or not the exposure operation (recording exposure operation) is finished (step #13).

As a result, when the exposure operation is not finished, (NO at step #13), the process returns to the processing at step #11, whereas when the exposure operation is finished (YES at step #13), the process returns the processing at step #7.

FIG. 13 is a flowchart showing a subroutine of the shake detection processing at steps #7 and #12 of FIG. 12.

As shown in FIG. 13, the A/D converter 33 subjects the output from the amplifier 32 to A/D conversion (step #21), and the controller 22 determines whether or not an exposure operation (the recording exposure operation) is being carried out (step #22). When the exposure operation is being carried out (YES at step #22), the controller 22 goes to a processing at step #43. Whereas when the exposure operation is not being carried out (NO at step #22), the controller 22 cuts a predetermined low frequency signal by the second HPF 34 (step #23).

Each time the controller 22 is encountered with the processing at step #23 during a time until the switch S2 is turned on, it gradually decreases the cut-off frequency of the second HPF 34 within a range of, for example, from 0.9 kHz to 0.1 kHz This operation is carried out to cut the direct current component signal, which is included in a large amount just after a panning operation is carried out, by setting the cut-off frequency of the second HPF 34 to a high value at first as well as to avoid that a state, in which even a signal necessary to shake detection is removed, is continued by the cutting operation by gradually decreasing the cut-off frequency of the second HPF 34.

Next, the controller 22 determines whether or not a predetermined time has passed from a timing at which the shake detection starts (correction timer counts a count value corresponding to the predetermined time) as well as whether or not the switch S2 is turned off (step #24). As a result, when the time has passed from the timing at which the shake detection starts as well as the switch S2 is turned off at that time, (YES at step #24), the controller 22 goes to a processing at step #26. Otherwise (NO at step #24), the controller 22 determines whether or not the time has not passed from the timing at which the shake detection starts as well as the switch S2 is turned on at that time (step #25).

As a result, when the time has not passed from the timing at which the shake detection starts as well as the switch S2 is turned on at that time (YES at step #25), the controller 22 goes to the processing at step #26. Otherwise (NO at step #25), the controller 22 goes to a processing at step #43.

At step #26, the controller 22 determines whether or not both the first and second shake correction amount deriving units 38, 39 are in operation, that is, whether or not only the first shake correction amount deriving unit 38 is in operation (state of the short period A shown in FIG. 11) (step #26). When both the first and shake correction amount deriving units 38, 39 are not in operation (NO at step #26), the controller 22 causes the first integration unit 35 of the shake correction amount deriving main side unit (first shake correction amount deriving unit 38 in an initial cycle) to integrate the output from the second HPF 34 (step #27). Note that, here, the output from the first integration unit 35 is subjected to a correction processing by the correction unit 37 using the output from the second integration unit 36 at a predetermined timing (time T=t1 shown in FIG. 11) and corrected according to the output from the second integration unit 36.

Thereafter, the controller 22 starts counting again after the correction amount of the correction unit 37 in the first shake correction amount deriving unit 38 is stored to the storage unit 50 (step #28) and the correction timer is reset (step #29).

In contrast, when both the first and second shake correction amount deriving units 38, 39 are in operation at step #26 (YES at step #26), the controller 22 determines whether or not a predetermined time has not passed from the timing at which a shake detection starts as well as the switch S2 is turned on at that time likewise at step #25 (step #30), and when the time has not passed from the timing at which the shake detection starts as well as the switch S2 is turned on (YES at step #30), the controller 22 goes to the processing at step #43. Otherwise (NO at step #30), the controller 22 causes the first integration unit 35 of the shake correction amount deriving main side unit to integrate the output from the second HPF 34 (step #31) and further causes the second integration unit 36 of the shake correction amount deriving main side unit to integrate the output from the first integration unit 35 (step #32).

Next, the controller 22 causes the first integration unit 35 of the shake correction amount deriving sub side unit to start a processing (step #33). The output from the first integration unit 35 in the shake correction amount deriving sub side unit is subjected to a correction processing by the correction unit 37 using the output from the second integration unit 36 at a predetermined timing and corrected according to the output from the second integration unit 36.

Then, the controller 22 compares the absolute value of the latest correction amount stored to the storage unit 50 with the absolute value of the correction amount of this time of the correction unit 37 of the shake correction amount deriving sub side unit (step #34). As a result, when the correction amount of this time of the correction unit 37 in the shake correction amount deriving sub side unit is smaller than the correction amount stored to the storage unit 50 (YES at step #35), the shake correction amount deriving main side unit is changed (switched and set) (step #36).

Further, the controller 22 determines whether or not the correction amount of this time of the correction unit 37 in the shake correction amount deriving sub side unit is equal to or less than a predetermined value (step #37), and when the correction amount of this time is not equal to or less than the predetermined value (NO at step #37), the correction amount is stored to the storage unit 50 so as to update a stored correction amount (step #38). In contrast, when the correction amount of this time is equal to or less than the predetermined value (YES at step #37), the correction amount is set to zero and is stored to the storage unit 50 so as to update a stored correction amount (step #39).

When the correction amount of this time of the correction unit 37 in the shake correction amount deriving sub side unit is not smaller than the correction amount stored to the storage unit 50 at step #35 (NO at step #35), the controller 22 goes to a processing at step #40 skipping processings at steps #36 to #39.

After processings are carried out at steps #35, #38, #39, the controller 22 sets the second HPF 34 in the shake correction amount deriving sub side unit (new shake correction amount deriving main side unit) to an initial value (step #40). Further, after the controller 22 resets the first and second integration units 35, 36 in the shake correction amount deriving sub side unit (step #41), it causes the shake correction amount deriving sub side unit to start a shake detecting operation (step #42).

When the predetermined time has not passed from the timing at which the shake detection starts as well as the switch S2 is turned on at the time at step #25, (NO at step #25), the controller 22 causes the first integration units 35 of the first and second shake correction amount deriving units 38, 39 to start processings (step #43) and causes the second integration units 36 of the first and second shake correction amount deriving units 38, 39 to start processings (step #44).

As described above, the first and second shake correction amount deriving units 38, 39 are alternately operated in every short period composed of the time shorter than the period up to the timing at which it is contemplated that the output from the first HPF 31 is approximately stabilized after the switch S1 is turned on, and the signals of shake correction amounts, which are obtained by subjecting the outputs from the first integration units 35 to a correction of the correction amounts, are alternately employed as the drive signals to be output to the X-axis and Y-axis actuators 27, 28. With this arrangement, a shake correction amount deriving unit, which is operated later than a shake correction amount deriving unit operated just before it, can derive a shake correction amount based on a state in which the first HPF 31 has a smaller output error. Therefore, it is possible to decrease a shake correction error after the panning operation is finished. As a result, the image quality of a picked up image can be prevented or suppressed from being deteriorated by the signal of an inverse polarity of the first HPF 31.

Further, when the delay time of a timing, at which the shake detecting operation is started by the second shake correction amount deriving unit 39, with respect to a timing at which the first shake correction amount deriving unit 38 starts the shake detecting operation is caused to agree with a time corresponding to a cycle of the correcting operation carried out by the correction unit 37, a time can be easily managed, thereby the time managing program can be simplified.

The invention claimed is:

1. A shake detection apparatus, comprising:
   shake detection means for outputting an electric signal according to shake applied to the shake detection apparatus;
   a plurality of shake correction amount deriving means, each including
      means for high-pass filtering the electric signal output from the shake detection means,
      means for integrating the high-pass filtered electric signal, and
      correction means for deriving shake correction amounts for correcting the shake applied to the shake detection apparatus based on the high-pass filtered electric signal;
   control means for independently starting operation of each correction means in the plurality of shake correction amount deriving means; and
   output means for selecting any of the plurality of shake correction amount deriving means and outputting the shake correction amount derived by the selected shake correction amount deriving means as a shake correction amount used to correct the shake applied to the shake detection apparatus.

2. The shake detection apparatus according to claim 1, further comprising:
   a high-pass filter including a capacitor and a resistor device,
   wherein an electric signal output from the shake detection means is input to the high-pass filter, and the high-pass filter outputs the electric signal to the means for high-pass filtering of each shake correction amount deriving means after eliminating a predetermined low frequency component signal from the electric signal.

3. The shake detection apparatus according to claim 1, wherein the control means causes one shake correction amount deriving means among the plurality of shake correction amount deriving means to start operation after a first predetermined time has passed from a timing at which an other shake correction amount deriving means is caused to start operation.

4. A shake detection apparatus, comprising:
   shake detection means for outputting an electric signal according to shake applied to the shake detection apparatus;
   a plurality of shake correction amount deriving means having integration means for integrating the electric signal output from the shake detection means and deriving shake correction amounts for correcting shake based on the electric signal;

output means for selecting any of the plurality of shake correction amount deriving means and outputting the shake correction amount derived by the selected shake correction amount deriving means as a shake correction amount used to correct the shake applied to the shake detection apparatus;

control means for causing one shake correction deriving means among the plurality of shake correction amount deriving means to start an operation after a first predetermined time has passed from a timing at which other shake correction amount deriving means is caused to start an operation, wherein each of the shake correction amount deriving means further includes first integration means for integrating the electric signal output from the shake detection means;

second integration means for integrating the output from the first integration means; and correction means for correcting the output from the first integration means using the output from the second integration means after a second predetermined time has passed from the timing at which the first integration means starts an operation.

5. The shake detection apparatus according to claim 4 wherein the first and second predetermined times are a same time.

6. The shake detection apparatus according to claim 4, wherein the output means carries out the selection when a correction is carried out by the correction means.

7. The shake detection apparatus according to claim 4, further comprising:

storage means for storing a correction amount used by correction means of the shake correction amount deriving means selected by the output means, wherein the output means compares a current correction amount used by the correction means of any one of the shake correction amount deriving means not currently selected with the correction amount stored in the storage means and selects a shake correction amount deriving means corresponding to a smallest correction amount, the output means outputting a shake correction amount derived based on the smallest correction amount as a shake correction amount used to correct the shake applied to the shake detection apparatus.

8. The shake detection apparatus according to claim 4, wherein the correction means comprises:

multiplication means for multiplying the current output of the second integration means by a predetermined coefficient; and subtraction means for subtracting a multiplied value obtained by a multiplication processing of the multiplication means from the output of next time from the first integration means and outputting a subtracted value to the first integration means.

9. A shake detection apparatus, comprising:

shake detection means for outputting an electric signal according to shake applied to the shake detection apparatus;

a plurality of shake correction amount deriving means having integration means for integrating the electric signal output from the shake detection means and deriving shake correction amounts for correcting shake based on the electric signal;

output means for selecting any of the plurality of shake correction amount deriving means and outputting the shake correction amount derived by the selected shake correction amount deriving means as a shake correction amount used to correct the shake applied to the shake detection apparatus;

control means for causing one shake correction deriving means among the plurality of shake correction amount deriving means to start an operation after a first predetermined time has passed from a timing at which other shake correction amount deriving means is caused to start an operation, wherein when the shake correction amount deriving means selected by the output means is changed, the control means temporarily interrupts the operation of any of the shake correction amount deriving means which are not selected by the output means and then resumes it.

10. A shake detection apparatus, comprising:

shake detection means for outputting an electric signal according to shake applied to the shake detection apparatus;

a plurality of shake correction amount deriving means, each including means for high-pass filtering the electric signal output from the shake detection means, means for integrating the high-pass filtered electric signal, and correction means for deriving shake correction amounts for correcting the shake applied to the shake detection apparatus based on the high-pass filtered electric signal;

control means for independently starting operation of each correction means of the plurality of shake correction amount deriving means;

output means for selecting any of the plurality of shake correction amount deriving means and outputting the shake correction amount derived by the selected shake correction amount deriving means as a shake correction amount used to correct the shake applied to the shake detection apparatus; and drive means for driving a target based on the shake detection signal output from the output means to correct the shake.

11. An image pickup apparatus, comprising:

image pickup means for picking up a subject image;

shake detection means for outputting an electric signal according to shake;

a plurality of shake correction amount deriving means, each including means for high-pass filtering the electric signal output from the shake detection means, means for integrating the high-pass filtered electric signal, and correction means for deriving shake correction amounts for correcting the shake applied to the shake detection apparatus based on the high-pass filtered electric signal;

control means for independently starting operation of each correction means of the plurality of shake correction amount deriving means;

output means for selecting any of the plurality of shake correction amount deriving means and outputting the shake correction amount derived by the selected shake correction amount deriving means as a shake correction amount used to correct the shake; and drive means for driving a target based on the shake detection signal output from the output means to correct the shake.

12. A shake detection method to cause a shake detection apparatus to correct a shake, comprising:
outputting, from a shake detection sensor, an electric signal according to the shake;
filtering, in a plurality of high-pass filters connected in parallel to the shake detection sensor, the electric signal;
integrating, in a plurality of integrators respectively connected to the plurality of high-pass filters, each of the filtered electric signals, each of the plurality of integrators starting operation at different times;
deriving, from each of the plurality of integrators, shake correction amounts for correcting shake based on each of the filtered electric signals; and
selecting a smallest one of the shake correction amounts derived from the plurality of integrators as a shake correction amount used to correct the shake.

* * * * *